(12) United States Patent
Sasaki

(10) Patent No.: US 6,583,954 B1
(45) Date of Patent: Jun. 24, 2003

(54) THIN-FILM MAGNETIC HEAD AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/368,415

(22) Filed: Aug. 5, 1999

(30) Foreign Application Priority Data

Aug. 26, 1998 (JP) .......................................... 10-240372

(51) Int. Cl.[7] .............................................. G11B 5/147
(52) U.S. Cl. ..................................................... 360/126
(58) Field of Search ............................. 360/119, 125, 360/126

(56) References Cited

U.S. PATENT DOCUMENTS

| | | | |
|---|---|---|---|
| 5,438,747 A | 8/1995 | Krounbi et al. | 29/603.16 |
| 5,600,519 A | 2/1997 | Heim et al. | 360/126 |
| 5,828,533 A * | 10/1998 | Ohashi et al. | 360/120 |
| 5,959,813 A * | 9/1999 | Watanabe et al. | 360/126 |
| 6,130,809 A * | 10/2000 | Santini | 360/126 |
| 6,154,345 A * | 11/2000 | Ishiwata et al. | 360/317 |
| 6,337,783 B1 * | 1/2002 | Santini | 360/125 |

FOREIGN PATENT DOCUMENTS

| JP | A 7-262519 | 10/1995 |
|---|---|---|
| JP | A 8-249614 | 9/1996 |

* cited by examiner

Primary Examiner—Carl Whitehead, Jr.
Assistant Examiner—Jennifer M Dolan
(74) Attorney, Agent, or Firm—Oliff & Berridge PLC

(57) ABSTRACT

It is an object of the invention to obtain an optimal overwrite property even when the magnetic pole width is reduced. In a thin-film magnetic head of the invention an auxiliary layer made of a magnetic material is provided on a region in the neighborhood of the air-bearing-surface-side end of the insulating layer that defines the throat height. Since the auxiliary layer is provided, the volume of the portion of the magnetic layer in the neighborhood of throat height zero position TH0 is greater by the volume of the auxiliary layer, compared to a configuration in which a top pole layer is only provided. It is therefore possible to prevent magnetic flux saturation in the neighborhood of the throat height zero position.

38 Claims, 21 Drawing Sheets

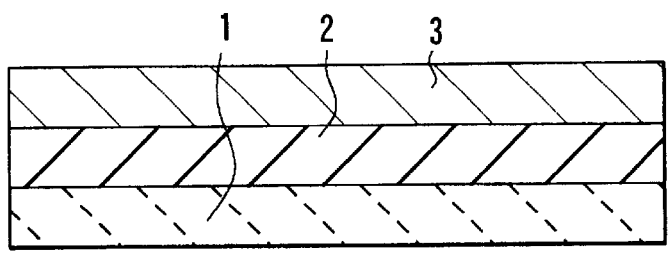
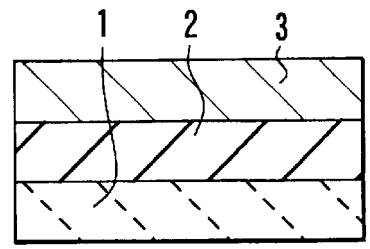
FIG. 1A FIG. 1B
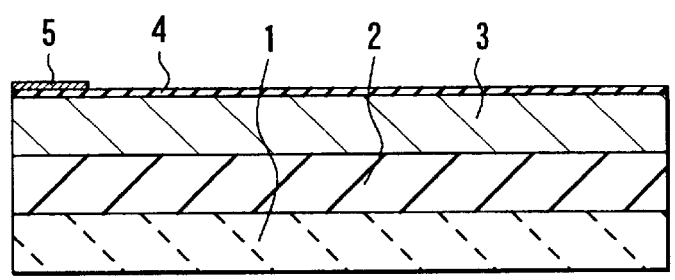
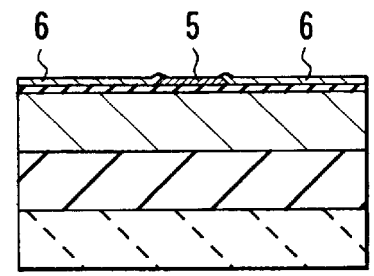
FIG. 2A FIG. 2B
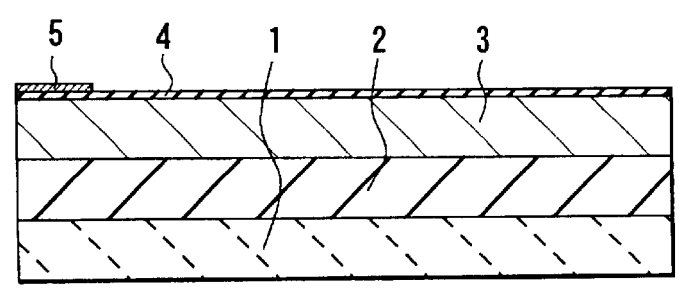
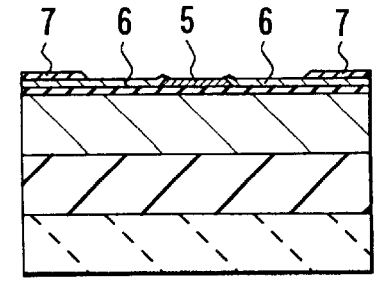
FIG. 3A FIG. 3B

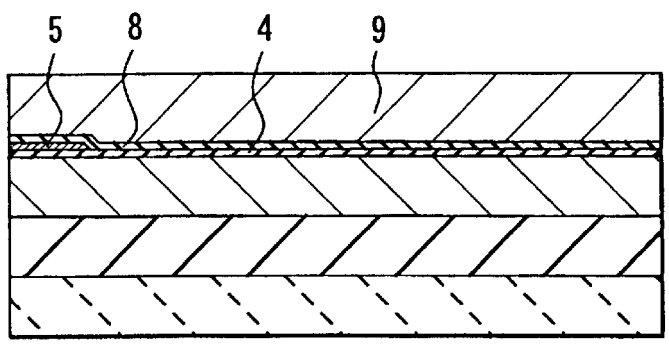
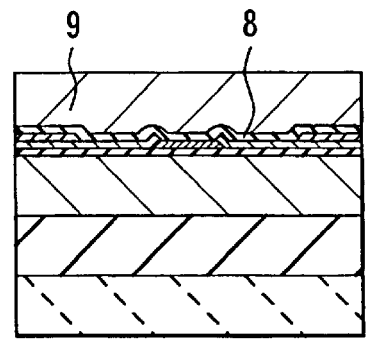
FIG. 4A  FIG. 4B
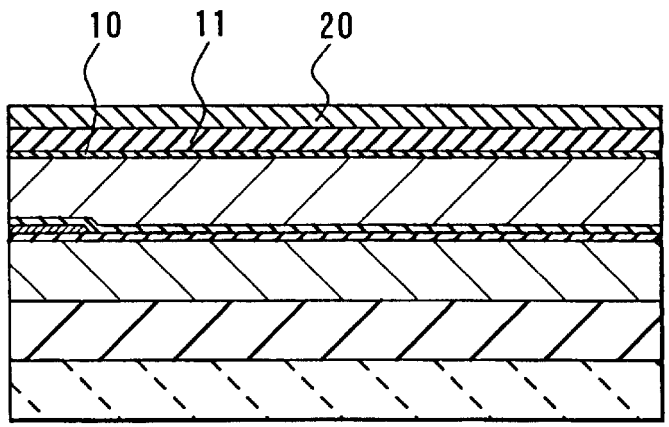
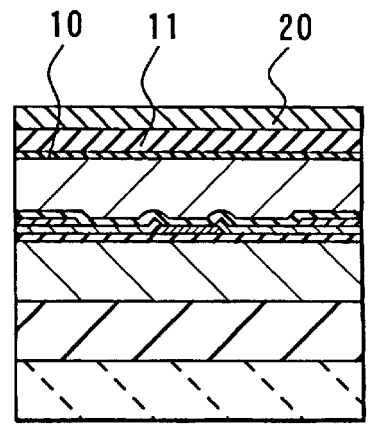
FIG. 5A  FIG. 5B

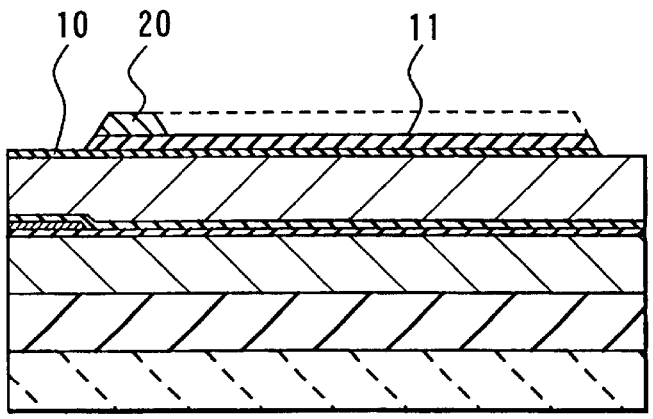
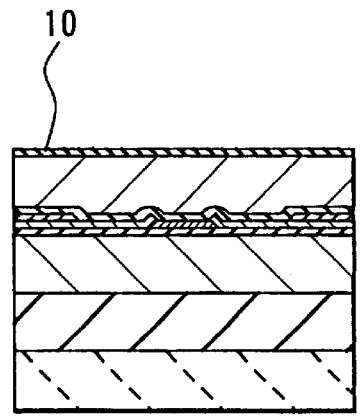
FIG. 6A    FIG. 6B
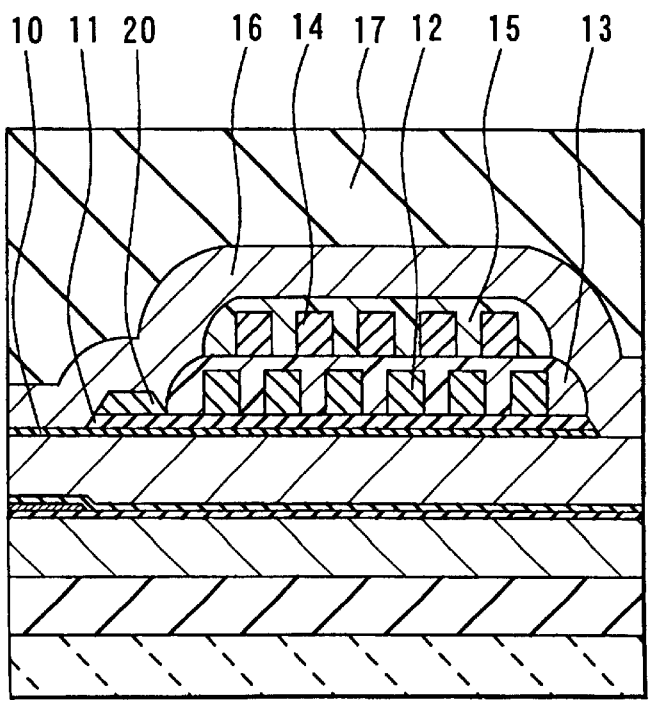
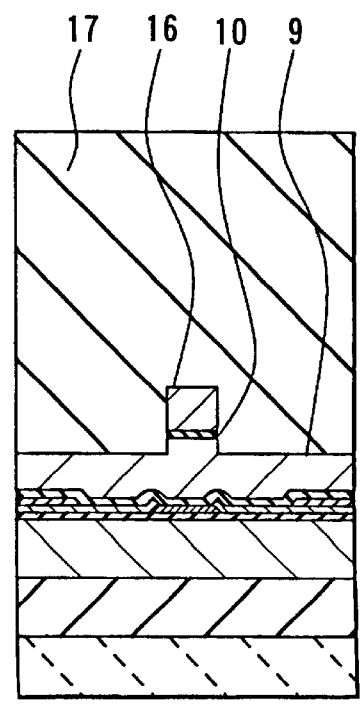
FIG. 7A    FIG. 7B

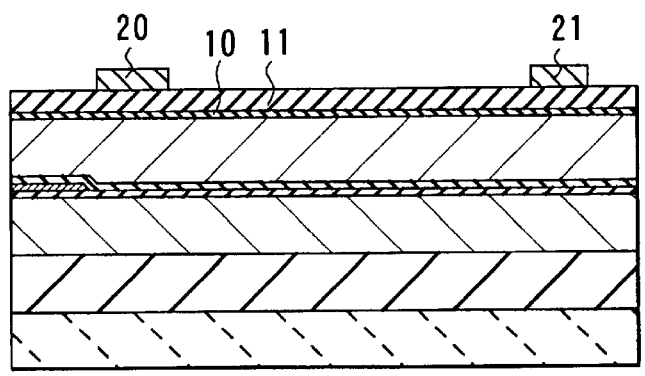
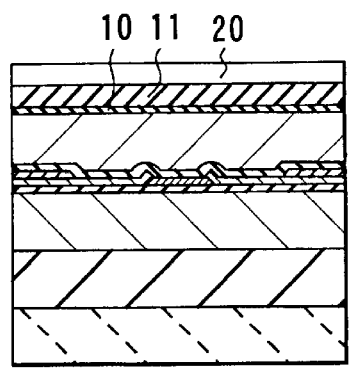
FIG. 9A  FIG. 9B
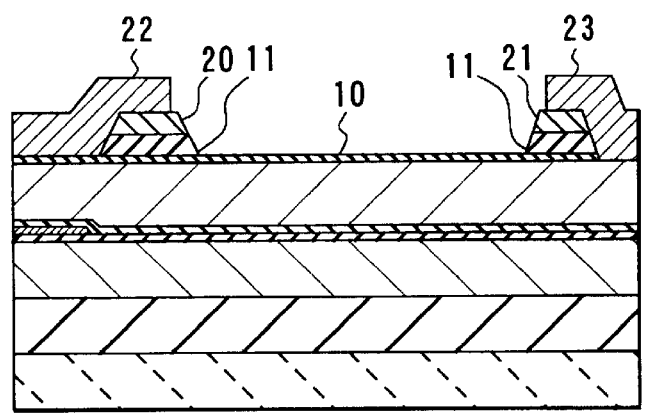
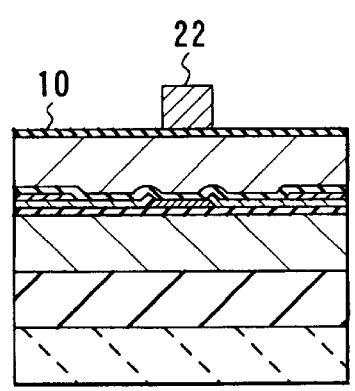
FIG. 10A  FIG. 10B
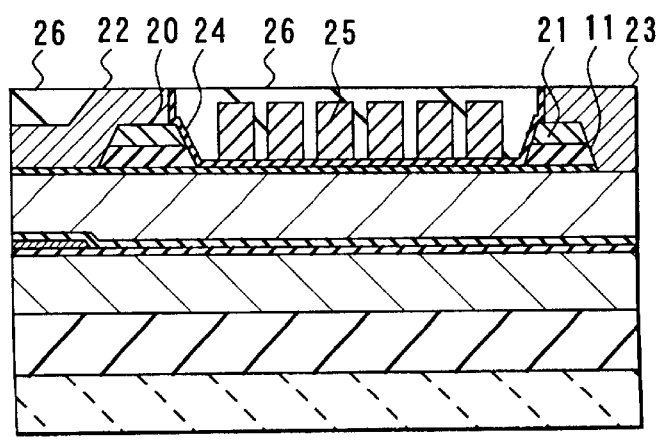
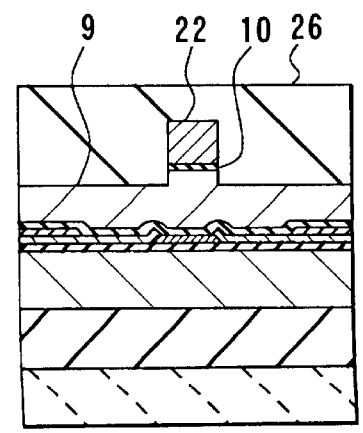
FIG. 11A  FIG. 11B

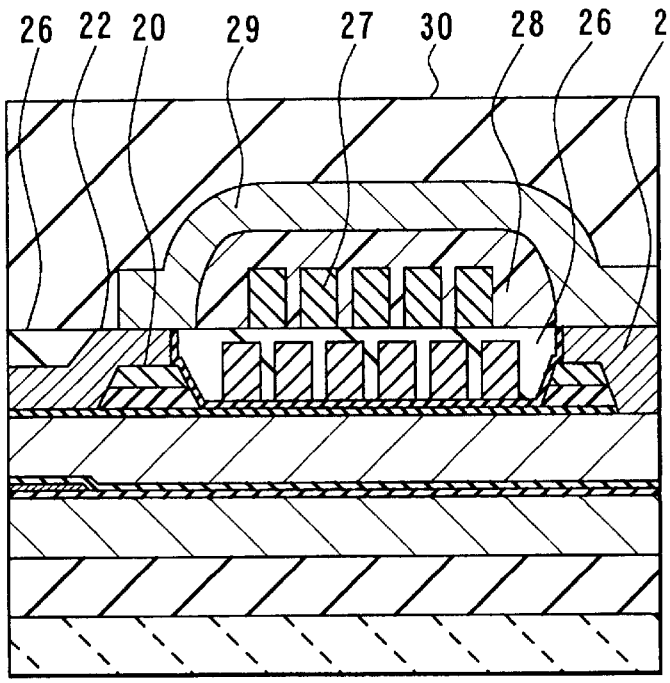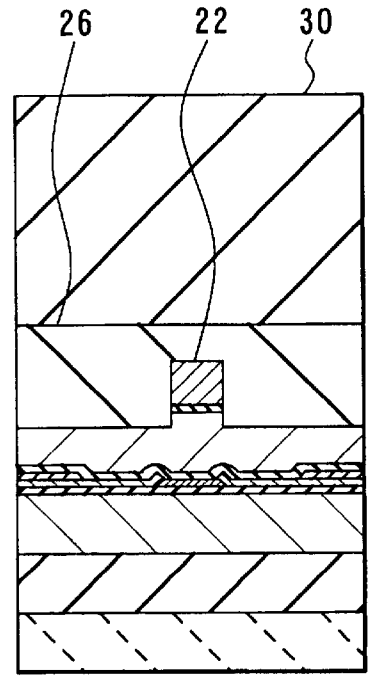
FIG. 12A        FIG. 12B
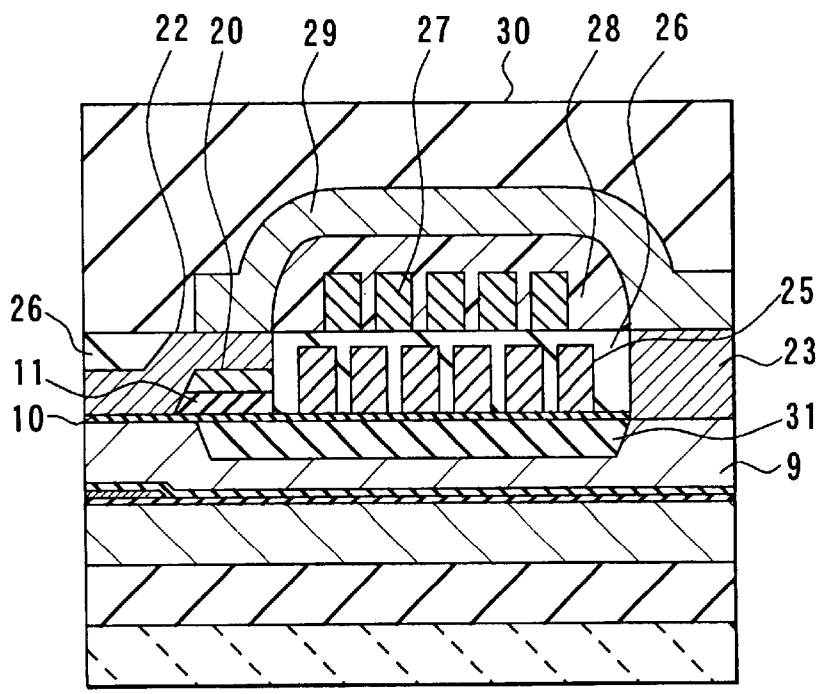
FIG. 13

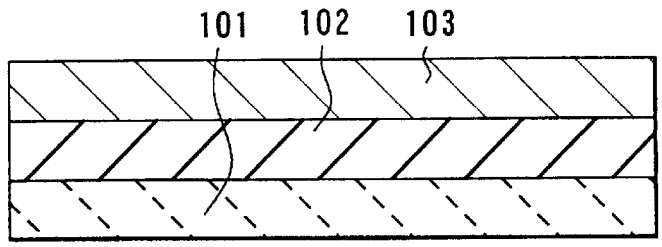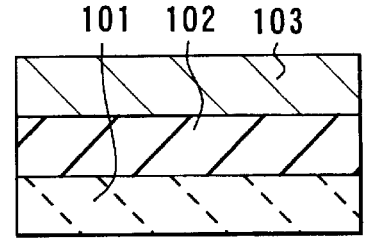
FIG. 31A
RELATED ART
FIG. 31B
RELATED ART
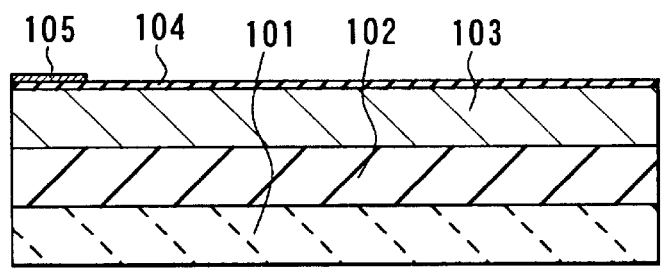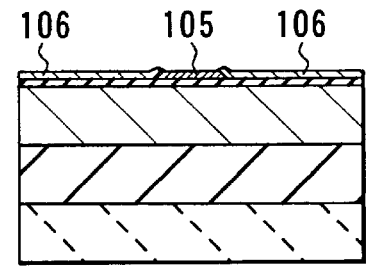
FIG. 32A
RELATED ART
FIG. 32B
RELATED ART

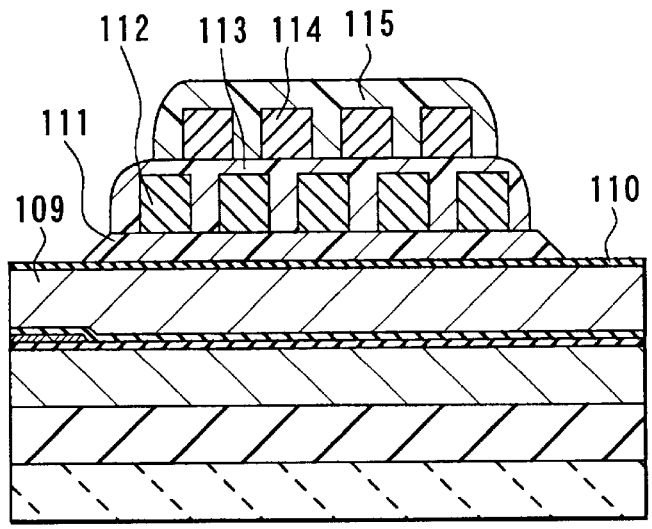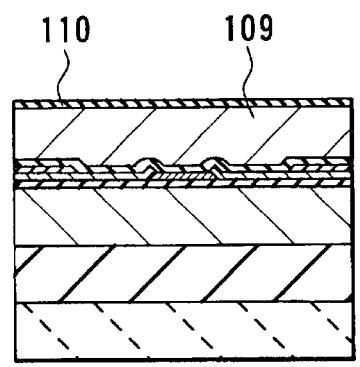
FIG. 35A
RELATED ART
FIG. 35B
RELATED ART
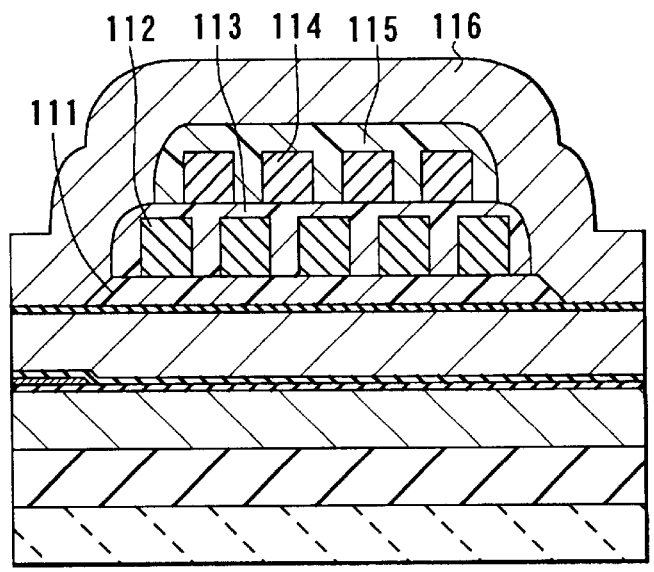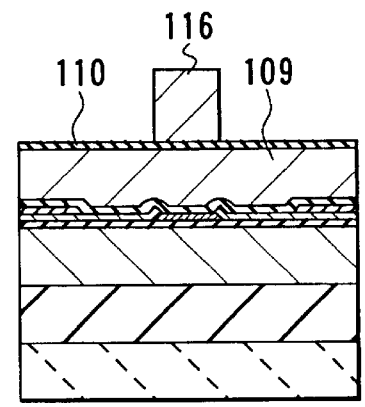
FIG. 36A
RELATED ART
FIG. 36B
RELATED ART

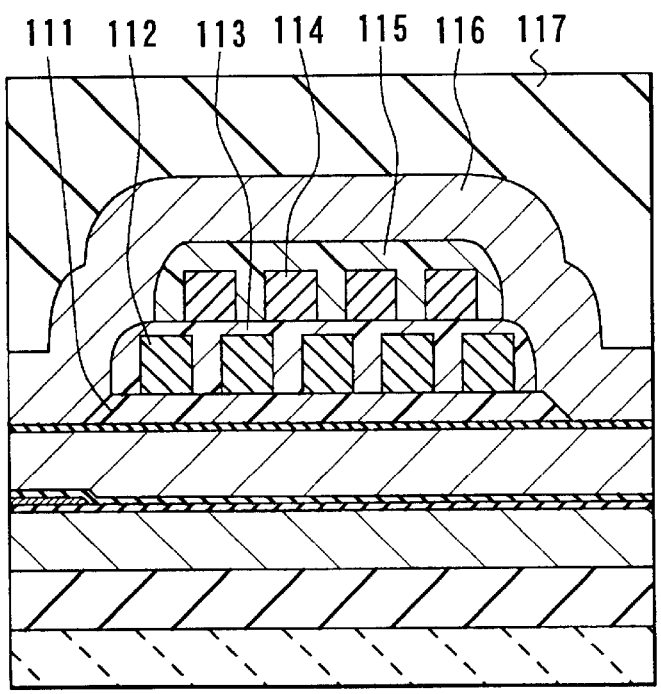
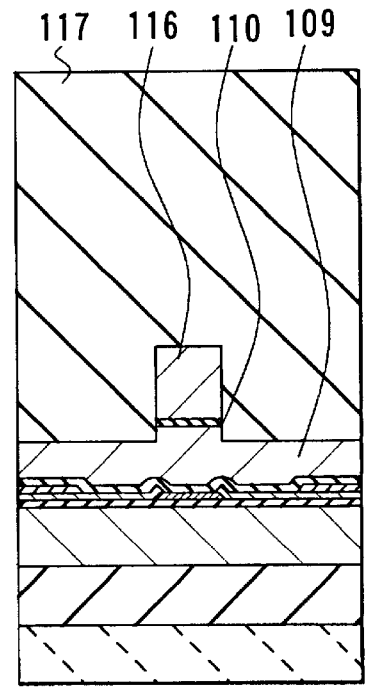
FIG. 37A
RELATED ART
FIG. 37B
RELATED ART

THIN-FILM MAGNETIC HEAD AND METHOD OF MANUFACTURING SAME

BACKGROUND OF THE INVENTION

1. Field of the Invention

The present invention relates to a thin-film magnetic head having at least an induction-type magnetic transducer for writing and a method of manufacturing the thin-film magnetic head.

2. Description of the Related Art

Performance improvements in thin-film magnetic heads have been sought with an increase in surface recording density of a hard disk drive. A composite thin-film magnetic head has been widely used which is made of a layered structure including a recording head having an induction-type magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called AMR head or simply MR head. A reproducing head using a GMR element is called GMR head. An AMR head is used as a reproducing head whose surface recording density is more than 1 gigabit per square inch. A GMR head is used as a reproducing head whose surface recording density is more than 3 gigabit per square inch.

Methods for improving the performance of a reproducing head include replacing an AMR film with a GMR film and the like having an excellent magnetoresistive sensitivity and optimizing the pattern width such as the MR height, in particular. The MR height is the length (height) between the air-bearing-surface-side end of an MR element and the other end. The MR height is controlled by an amount of lapping when the air bearing surface is processed. The air bearing surface is the surface of a thin-film magnetic head that faces a magnetic recording medium and may be called track surface as well.

Performance improvements in a recording head have been expected, too, with performance improvements in a reproducing head. One of the factors determining the recording head performance is the throat height (TH). The throat height is the length (height) of the pole portion between the air bearing surface and the end of the insulating layer electrically isolating the thin-film coil for generating magnetic flux. A reduction in throat height is desired in order to improve the recording head performance. The throat height is controlled as well by an amount of lapping when the air bearing surface is processed.

It is required to increase the track density on a magnetic recording medium in order to increase the recording density among the performances of a recording head. In order to achieve this, it is required to implement a recording head of a narrow track structure wherein the width on the air bearing surface of a bottom pole and a top pole sandwiching a write gap is reduced to the order of some microns to submicron. Semiconductor process techniques are employed to achieve the narrow track structure.

Reference is now made to FIG. 31A to FIG. 37A and FIG. 31B to FIG. 37B to describe an example of a method of manufacturing a related-art composite thin-film magnetic head. FIG. 31A to FIG. 37A are cross sections each orthogonal to the air bearing surface. FIG. 31B to FIG. 37B are cross sections each parallel to the air bearing surface.

In the manufacturing method, as shown in FIG. 31A and FIG. 31B, an insulating layer 102 made of alumina ($Al_2O_3$), for example, having a thickness of about 5 μm is deposited on a substrate 101 made of aluminum oxide and titanium carbide ($Al_2O_3$-TiC), for example. On the insulating layer 102 a bottom shield layer 103 made of a magnetic material of 2 to 3 μm in thickness is formed for making a reproducing head.

Next, as shown in FIG. 32A and FIG. 32B, on the bottom shield layer 103 alumina or aluminum nitride, for example, of 50 to 150 nm in thickness is deposited through sputtering to form a bottom shield gap film 104 as an insulating layer. On the bottom shield gap film 104 an MR film of tens of nanometers in thickness is formed for making an MR element 105 for reproduction. Next, on the MR film a photoresist pattern is selectively formed where the MR element 105 is to be formed. The photoresist pattern takes a shape that facilitates lift-off, such as a shape having a T-shaped cross section. Next, with the photoresist pattern as a mask, the MR film is etched through ion-milling, for example, to form the MR element 105. The MR element 105 may be either a GMR element or an AMR element. Next, on the bottom shield gap film 104 a pair of first electrode layers 106 having a thickness of tens of nanometers are formed, using the photoresist pattern as a mask. The first electrode layers 106 are electrically connected to the MR element 105. The first electrode layers 106 may be formed through stacking TiW, CoPt, TiW, and Ta, for example. Next, the photoresist pattern is lifted off.

Next, as shown in FIG. 33A and 33B, a pair of second electrode layers 107 having a thickness of 150 nm, for example, are formed into a specific pattern. The second electrode layers 107 are electrically connected to the first electrode layers 106. The second electrode layers 107 may be made of copper (Cu), for example. The first electrode layers 106 and the second electrode layers 107 make up leads electrically connected to the MR element 105.

Next, as shown in FIG. 34A and FIG. 34B, a top shield gap film 108 of 50 to 150 nm in thickness is formed as an insulating layer on the bottom shield gap film 104 and the MR film 105. The MR film 105 is embedded in the shield gap films 104 and 108. Next, on the top shield gap film 108 a top shield layer-cum-bottom pole layer (called bottom pole layer in the following description) 109 of about 3 μm in thickness is formed. The bottom pole layer 109 is made of a magnetic material and used for both a reproducing head and a recording head.

Next, as shown in FIG. 35A and FIG. 35B, on the bottom pole layer 109, a recording gap layer 110 made of an insulating film such as an alumina film whose thickness is about 0.2 to 0.3 μm is formed. On the recording gap layer 110 a photoresist layer 111 for determining the throat height is formed into a specific pattern whose thickness is about 1.0 to 2.0 μm. Next, on the photoresist layer 111 a thin-film coil 112 of a first layer is made for the induction-type recording head. The thickness of the thin-film coil 112 is 3 μm. Next, a photoresist layer 113 is formed into a specific pattern on the photoresist layer 111 and the coil 112. Heat treatment is then performed at a temperature of 200 to 250° C., for example, to flatten the surface of the photoresist layer 113. On the photoresist layer 113 a thin-film coil 114 of a second layer is then formed into a thickness of 3 μm. Next, a photoresist layer 115 is formed into a specific pattern on the photoresist layer 113 and the coil 114. Heat treatment is then performed at a temperature of 200 to 250° C., for example, to flatten the surface of the photoresist layer 115.

Next, as shown in FIG. 36A and FIG. 36B, a portion of the recording gap layer 110 behind the coils 112 and 114 (the right side of FIG. 36A) is etched to form a magnetic path. A top pole layer 116 having a thickness of about 3 µm is then formed for the recording head on the recording gap layer 110 and the photoresist layers 111, 113 and 115. The top pole layer 116 is made of a magnetic material such as Permalloy (NiFe) or FeN as a high saturation flux density material. The top pole layer 116 comes to contact with the bottom pole layer 109 and is magnetically coupled to the bottom pole layer 109 in a portion behind the coils 112 and 114.

Next, as shown in FIG. 37A and FIG. 37B, the recording gap layer 110 and the bottom pole layer 109 are etched through ion-milling, using the top pole layer 116 as a mask. Next, an overcoat layer 117 of alumina, for example, having a thickness of 20 to 30 µm is formed to cover the top pole layer 116. Finally, machine processing of the slider is performed to form the air bearing surface of the recording head and the reproducing head. The thin-film magnetic head is thus completed. As shown in FIG. 37B, the structure is called trim structure wherein the sidewalls of the top pole layer 116, the recording gap layer 110, and part of the bottom pole layer 109 are formed vertically in a self-aligned manner. The trim structure suppresses an increase in the effective track width due to expansion of the magnetic flux generated during writing in a narrow track.

FIG. 38 is a top view of the thin-film magnetic head manufactured as described above. The overcoat layer 117 is omitted in FIG. 38. FIG. 31A to FIG. 37A are cross sections taken along line 37A–37A of FIG. 38. FIG. 31B to FIG. 37B are cross sections taken along line 37B–37B of FIG. 38.

FIG. 39 is an example of the structure of the top pole layer 116. The top pole layer 116 has a pole portion 116a placed closer to the air bearing surface 120 and a yoke portion 116b placed in a position facing the coils 112 and 114. In the example the width of the pole portion 116a is 1.7 to 2.0 µm. The greatest width of the yoke portion 116b is 40 to 50 µm. Part of the yoke portion 116b closer to the pole portion 116a tapers down to the pole portion 116a. The periphery of the tapered portion forms an angle of 45 degrees, for example, with a surface parallel to the air bearing surface 120.

In the following description the position of the air-bearing-surface-side end of the insulating layer electrically isolating the thin-film coil is called throat height zero position and indicated with TH0. In the example shown in FIG. 39 the distance is 3.0 to 5.0 µm from throat height zero position TH0 to the interface between the pole portion 116a and the yoke portion 116b.

In order to achieve high surface density recording, it is required that the recording track width, that is, the pole portion width (called pole width in the following description) is reduced. FIG. 40 shows an example of the shape of the top pole layer 116 whose pole width is smaller than that of the top pole layer 116 shown in FIG. 39. In the example the width of the pole portion 116a is 0.8 to 1.2 µm. The pole portion 116a having a width of the submicron order such as 0.4 µm may be implemented in the future.

If the shape of the top pole layer 116 is like the one shown in FIG. 39, the magnetic flux generated from the coils 112 and 114 reaches the tip of the pole portion without saturating before reaching the pole portion.

However, if the pole width is reduced as shown in FIG. 40, for example, the flux is saturated near throat height zero position TH0 and the flux would not fully reach the tip of the pole portion. As a result, the value indicating the overwrite property is reduced to about 10 to 20 dB, for example. The overwrite property is required for writing data over data already written on a recording medium. It is therefore difficult to obtain a sufficient overwrite property.

In Japanese Patent Application Laid-open Hei 8-249614 (1996) a technique is disclosed wherein the shape of the top pole layer is such that the width gradually increases from the throat height zero position to the point where the top pole layer width starts to increase greatly. However, the technique is provided for having the magnetic flux saturated almost simultaneously between the throat height zero position and the point where the top pole layer width starts to increase greatly. Therefore this structure does not prevent the flux from saturating near the throat height zero position.

As disclosed in Japanese Patent Application Laid-open Hei 7-262519 (1995), frame plating may be used as a method for fabricating the top pole layer. In this case, a thin electrode film made of Permalloy, for example, is formed by sputtering, for example, to fully cover the apex, that is, the crest of the coil. Next, a photoresist is applied on the electrode film and patterned through a photolithography process to form a frame to be used for plating. The top pole layer is then formed by plating through the use of the electrode film previously formed as a seed layer.

However, there is a difference in height between the apex and other portions such as 7 to 10 µm or above. The photoresist whose thickness is 3 to 4 µm is applied to cover the apex. If the photoresist thickness is required to be at least 3 µm over the apex, a photoresist film having a thickness of 8 to 10 µm or more, for example, is formed below the apex since the fluid photoresist goes downward.

To form a pole portion having a smaller width, it is required to form a frame pattern whose width is about 1.0 µm through the use of a photoresist film. That is, it is required to form a minute pattern having a width of 1.0 µm or below through the use of a photoresist film having a thickness of 8 to 10 µm or above. However, it is extremely difficult to form a photoresist pattern having such a thickness into a reduced pattern width in a manufacturing process.

Furthermore, rays of light used for exposure of photolithography are reflected off the bottom electrode film as the seed layer. The photoresist is exposed to the reflected rays as well and the photoresist pattern may be out of shape. It is therefore impossible to obtain a sharp and precise photoresist pattern. As a result, the sidewall of the top pole layer may have a round shape and so on and it is impossible to form the top pole layer into a desired shape. If the top pole layer 116 is to be formed into a shape as shown in FIG. 40, in particular, in the region near the interface between the pole portion 116a and the yoke portion 116b, the rays reflected off the bottom electrode film include not only vertical reflected rays but also rays in slanting directions and rays in lateral directions from the slope of the apex. Those reflected rays of light affect exposure of the photoresist layer and the photoresist pattern width that defines the pole width is thereby likely to become greater than a desired width.

SUMMARY OF THE INVENTION

It is a first object of the invention to provide a thin-film magnetic head and a method of manufacturing the same for achieving an optimal overwrite property even when the pole width is reduced.

In addition to the first object, it is a second object of the invention to provide a thin-film magnetic head and a method of manufacturing the same for precisely controlling the pole width even when the pole width is reduced.

A thin-film magnetic head of the invention comprises: a medium facing surface that faces a recording medium; a first magnetic layer and a second magnetic layer magnetically coupled to each other and including magnetic pole portions placed in regions of the magnetic layers on a side of the medium facing surface, the pole portions being opposed to each other, the magnetic layers each being made up of at least one layer; a gap layer provided between the pole portions of the first and second magnetic layers; a thin-film coil at least part of which is placed between the first and second magnetic layers; and an insulating layer for insulating the first and second magnetic layers from the thin-film coil. At least one of the magnetic layers includes: a main layer including one of the pole portions an end of which is placed in the medium facing surface and a yoke portion magnetically coupled directly or indirectly to the other end of the pole portion; and an auxiliary layer magnetically connected to the main layer and provided for increasing the thickness of part of the magnetic layer in the neighborhood of a portion connecting the pole portion to the yoke portion so that the thickness is greater than the thickness of the other part of the magnetic layer.

A method of the invention is provided for manufacturing a thin-film magnetic head comprising: a medium facing surface that faces a recording medium; a first magnetic layer and a second magnetic layer magnetically coupled to each other and including magnetic pole portions placed in regions of the magnetic layers on a side of the medium facing surface, the pole portions being opposed to each other, the magnetic layers each being made up of at least one layer; a gap layer provided between the pole portions of the first and second magnetic layers; a thin-film coil at least part of which is placed between the first and second magnetic layers; and an insulating layer for insulating the first and second magnetic layers from the thin-film coil. The method includes the steps of forming the first and second magnetic layers, the gap layer, the thin-film coil, and the insulating layer, respectively. The step of forming at least one of the magnetic layers includes: the step of forming a main layer including one of the pole portions an end of which is placed in the medium facing surface and a yoke portion magnetically connected directly or indirectly to the other end of the pole portion; and the step of forming an auxiliary layer magnetically connected to the main layer and provided for increasing the thickness of part of the magnetic layer in the neighborhood of a portion connecting the pole portion to the yoke portion so that the thickness is greater than the thickness of the other part of the magnetic layer.

According to the thin-film magnetic head or the method of manufacturing the same of the invention, the auxiliary layer increases the thickness of part of the magnetic layer in the neighborhood of the portion connecting the pole portion to the yoke portion so that the thickness is greater than the thickness of the other part of the magnetic layer.

In the thin-film magnetic head or the method of manufacturing the same of the invention, the yoke portion may be greater than the one of the pole portions in width.

In the head or the method an end of the auxiliary layer closer to the medium facing surface may be placed in the neighborhood of an end of the insulating layer closer to the medium facing surface.

In the head or the method edges of the main layer extending in the direction intersecting the medium facing surface may include: first portions extending from the medium-facing-surface-side end of the main layer to the neighborhood of the medium-facing-surface-side end of the insulating layer; and second portions adjoining the first portions. The first portions are orthogonal to the medium facing surface. The second portions extend outward in the direction of width, each forming a specific angle with the first portions. In this case the specific angle preferably falls within a range between 90 and 120 degrees inclusive.

In the head or the method the pole portion and the yoke portion of the main layer may be either made up of one layer or made up of separate layers. If the pole portion and the yoke portion are made up of separate layers, the layer including the pole portions, the layer including the yoke portion, and the auxiliary layer may overlap one another.

In the head or the method the auxiliary layer may be placed between the two magnetic layers. In this case the auxiliary layer may be placed between the insulating layer and the one of the magnetic layers.

In the head or the method the main layer may further include an intermediate portion placed between the pole portion and the yoke portion and magnetically connected to the pole portion and the yoke portion. The width of the intermediate portion is between that of the pole portion and that of the yoke portion.

In the head or the method an end of the intermediate portion closer to the medium facing surface may be placed in the neighborhood of an end of the insulating layer closer to the medium facing surface.

In the head or the method edges of the pole portion extending in the direction intersecting the medium facing surface may be orthogonal to the medium facing surface. At the same time edges of the intermediate portion adjoining the edges of the pole portion may extend outward in the direction of width, each forming a specific angle with the edges of the pole portion. The specific angle preferably falls within a range between 90 and 120 degrees inclusive.

In the head or the method the intermediate portion may have a part uniform in width. The intermediate portion may have a part tapered down to the medium-facing-surface-side in width.

In the head or the method the intermediate portion and the auxiliary layer may overlap each other.

In the head or the method the main layer may include: a first layer including the pole portion and part of the intermediate portion; and a second layer including the yoke portion and the other part of the intermediate portion. In this case the first layer, the second layer and the auxiliary layer may overlap one another.

In the head or the method the auxiliary layer may have a shape approximating to at least part of the intermediate portion. Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 5A and FIG. 5B are cross sections for illustrating a step that follows FIG. 4A and FIG. 4B.

FIG. 6A and FIG. 6B are cross sections for illustrating a step that follows FIG. 5A and FIG. 5B.

FIG. 7A and FIG. 7B are cross sections of the thin-film magnetic head of the first embodiment of the invention.

FIG. 9A and FIG. 9B are cross sections for illustrating a step in a method of manufacturing a thin-film magnetic head of a second embodiment of the invention.

FIG. 10A and FIG. 10B are cross sections for illustrating a step that follows FIG. 9A and FIG. 9B.

FIG. 11A and FIG. 11B are cross sections for illustrating a step that follows FIG. 10A and FIG. 10B.

FIG. 12A and FIG. 12B are cross sections for illustrating a step that follows FIG. 11A and FIG. 11B.

FIG. 13 is a cross section of a thin-film magnetic head of a third embodiment of the invention.

FIG. 31A and FIG. 31B are cross sections for illustrating a step in a method of manufacturing a related-art thin-film magnetic head.

FIG. 32A and FIG. 32B are cross sections for illustrating a step that follows FIG. 31A and FIG. 31B.

FIG. 35A and FIG. 35B are cross sections for illustrating a step that follows FIG. 34A and FIG. 34B.

FIG. 36A and FIG. 36B are cross sections for illustrating a step that follows FIG. 35A and FIG. 35B.

FIG. 37A and FIG. 37B are cross sections for illustrating a step that follows FIG. 36A and FIG. 36B.

DETAILED DESCRIPTION OF THE PREFERRED EMBODIMENTS

Figure 8:
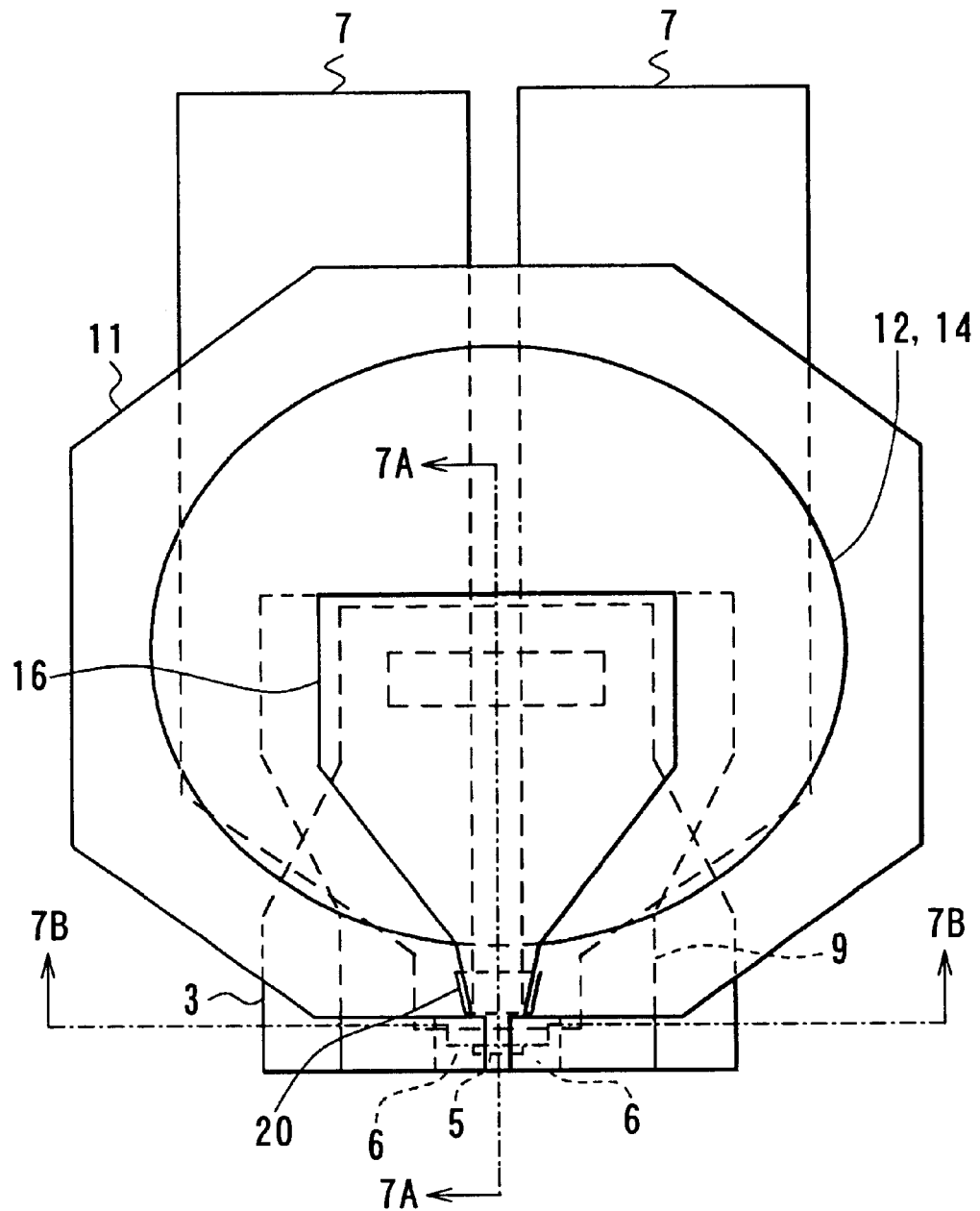
FIG. 8 is a top view of the thin-film magnetic head of the first embodiment.

Preferred embodiment of the invention will now be described in detail with reference to the accompanying drawings.

First Embodiment

Reference is now made to FIG. 1A to FIG. 7A, FIG. 1B to FIG. 7B, and FIG. 8 to describe a composite thin-film magnetic head and a method of manufacturing the same of a first embodiment of the invention. FIG. 1A to FIG. 7A are cross sections each orthogonal to the air bearing surface of the magnetic head. FIG. 1B to FIG. 7B are cross sections each parallel to the air bearing surface of the pole portion of the magnetic head.

In the manufacturing method, as shown in FIG. 1A and FIG. 1B, an insulating layer 2 made of alumina ($Al_2O_3$), for example, of about 5 μm in thickness is deposited on a substrate 1 made of aluminum oxide and titanium carbide ($Al_2O_3$-TiC), for example. On the insulating layer 2 a bottom shield layer 3 made of a magnetic material having a thickness of 2 to 3 μm is formed for making a reproducing head.

Next, as shown in FIG. 2A and FIG. 2B, on the bottom shield layer 3 alumina or aluminum nitride, for example, of 50 to 150 nm in thickness is deposited through sputtering to form a bottom shield gap film 4 as an insulating layer. On the bottom shield gap film 4 an MR film having a thickness of tens of nanometers is formed for making an MR element 5 for reproduction. Next, on the MR film a photoresist pattern is selectively formed where the MR element 5 is to be formed. The photoresist pattern takes a shape that facilitates lift-off, such as a shape having a T-shaped cross section. Next, with the photoresist pattern as a mask, the MR film is etched through ion-milling, for example, to form the MR element 5. The MR element 5 may be either a GMR element or an AMR element. Next, on the bottom shield gap film 4 a pair of first electrode layers 6 having a thickness of tens of nanometers are formed, using the photoresist pattern as a mask. The first electrode layers 6 are electrically connected to the MR element 5. The first electrode layers 6 may be formed through stacking TiW, CoPt, TiW, and Ta, for example. Next, the photoresist pattern is lifted off.

Next, as shown in FIG. 3A and 3B, a pair of second electrode layers 7 having a thickness of 150 nm, for example, are formed into specific patterns. The second electrode layers 7 are electrically connected to the first electrode layers 6. The second electrode layers 7 may be made of copper (Cu), for example. The first electrode layers 6 and the second electrode layers 7 make up leads electrically connected to the MR element 5.

Next, as shown in FIG. 4A and FIG. 4B, a top shield gap film 8 of 50 to 150 nm in thickness is formed as an insulating layer on the bottom shield gap film 4 and the MR film 5. The MR film 5 is embedded in the shield gap films 4 and 8. Next, on the top shield gap film 8 a top shield layer-cum-bottom pole layer (called bottom pole layer in the following description) 9 of about 3 $\mu$m in thickness is formed. The bottom pole layer 9 is made of a magnetic material and used for both a reproducing head and a recording head.

Next, as shown in FIG. 5A and FIG. 5B, on the bottom pole layer 9, a recording gap layer 10 made of an insulating film such as an alumina film whose thickness is about 0.2 to 0.3 $\mu$m is formed. On the recording gap layer 10 an insulating layer 11 whose thickness is 1.0 to 2.0 $\mu$m, for example, is formed. The insulating layer 11 may be any of a photoresist layer, an alumina film, a silicon dioxide film, a silicon nitride film and so on. Next, on the insulating layer 11 an auxiliary layer 20 made of a magnetic material, having a thickness of 1.0 to 2.0 $\mu$m, for example, is formed by plating or sputtering. The auxiliary layer 20 may be made of NiFe (80 weight % Ni and 20 weight % Fe) or either NiFe (50 weight % Ni and 50 weight % Fe) or FeN.

Next, as shown in FIG. 6A and FIG. 6B, the auxiliary layer 20 is etched through ion beam etching and the like with a photoresist film as a mask so that the auxiliary layer 20 is formed into a pattern for processing the insulating layer 11 into a desired shape. Next, the insulating layer 11 is etched with the auxiliary layer 20 as a mask to be formed into the desired shape. The auxiliary layer 20 is then etched with a photoresist film as a mask to be formed into a desired shape. Next, a portion of the recording gap layer 10 behind the insulating layer 11 (the right side of FIG. 6A) is etched to form a contact hole for making a magnetic path.

Next, as shown in FIG. 7A and FIG. 7B, on the insulating layer 11 a thin-film coil 12 of a first layer is made for the induction-type recording head. The thickness of the thin-film coil 12 is 3 $\mu$m, for example. Next, a photoresist layer 13 is formed into a specific pattern on the insulating layer 11 and the coil 12. Heat treatment is then performed at a temperature of 200 to 250° C., for example, to flatten the surface of the photoresist layer 13. Next, on the photoresist layer 13 a thin-film coil 14 of a second layer is then formed into a thickness of 3 $\mu$m, for example. A photoresist layer 15 is then formed into a specific pattern on the photoresist layer 13 and the coil 14. Heat treatment is then performed at a temperature of 200 to 250° C., for example, to flatten the surface of the photoresist layer 15.

Next, a top pole layer 16 made of a magnetic material and having a thickness of about 2 to 3 $\mu$m, for example, is formed for the recording head on the recording gap layer 10, the auxiliary layer 20, the insulating layer 11, and the photoresist layers 13 and 15. The top pole layer 16 comes to contact with the bottom pole layer 9 and is magnetically coupled to the bottom pole layer 9 in a portion behind the coils 12 and 14.

Next, the recording gap layer 10 and the bottom pole layer 9 are etched only by 0.3 to 0.5 $\mu$m, for example, through ion-milling, using the top pole layer 16 as a mask. A trim structure is thus formed. The trim structure suppresses an increase in the effective track width due to expansion of the magnetic flux generated during writing in a narrow track. Next, an overcoat layer 17 of alumina, for example, having a thickness of 30 to 40 $\mu$m is formed to cover the top pole layer 16. Finally, machine processing of the slider is performed to form the air bearing surface of the recording head and the reproducing head. The thin-film magnetic head is thus completed.

FIG. 8 is a top view of the thin-film magnetic head manufactured as described above. The overcoat layer 17 is omitted in FIG. 8. FIG. 1A to FIG. 7A are cross sections taken along line 7A—7A of FIG. 8. FIG. 1B to FIG. 7B are cross sections taken along line 7B—7B of FIG. 8.

The bottom pole layer 9 and the top pole layer 16 may be made of NiFe (80 weight % Ni and 20 weight % Fe) or a high saturation flux density material such as NiFe (50 weight % Ni and 50 weight % Fe), Sendust, FeN or a compound thereof, or an amorphous of Fe—Co—Zr. Alternatively, the pole layers 9 and 16 may be made of layers of two or more of the above materials.

In the embodiment the throat height is determined by the air-bearing-surface-side end of the insulating layer 11.

In the embodiment the top pole layer 16 and the auxiliary layer 20 correspond to one of magnetic layers of the invention. Of the magnetic layer the top pole layer 16 corresponds to a main layer of the invention and the auxiliary layer 20 corresponds to an auxiliary layer.

Figure 17:
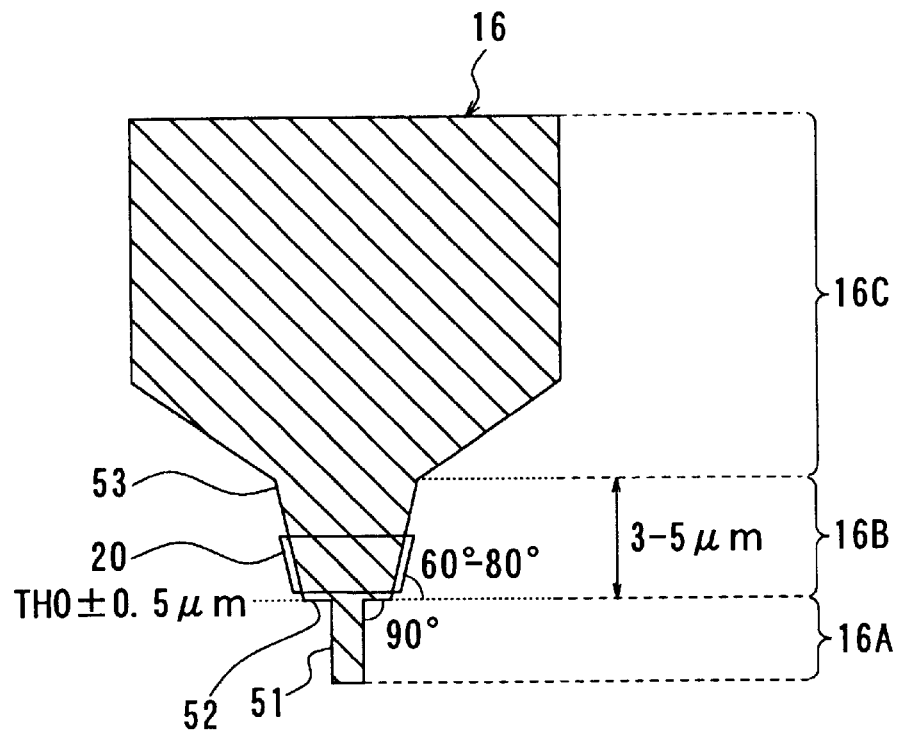
FIG. 17 is a view for illustrating an example of shapes of the main layer and the auxiliary layer and their placement in relation to each other of the invention.

FIG. 17 shows an example of shapes of the top pole layer 16 and the auxiliary layer 20 and their placement in relation to each other of the embodiment. In the embodiment the top pole layer 16 includes: a pole portion 16A one end of which is brought to the air bearing surface (medium facing surface); a yoke portion 16C magnetically connected to the other end of the pole portion 16A; and an intermediate portion 16B placed between the pole portion 16A and the yoke portion 16C and magnetically connected to the portions 16A and 16C. The intermediate portion 16B is between the pole portion 16A and the yoke portion 16C in width. The width of the yoke portion 16C is greater than that of the pole portion 16A.

The air-bearing-surface-side end of the intermediate portion 16B is located in the neighborhood of throat height zero position TH0, that is, the position of the air-bearing-surface-side end of the insulating layer 11 that defines the throat height. The neighborhood of throat height zero position TH0 means a margin of plus or minus 0.5 $\mu$m.

The air-bearing-surface-side end of the auxiliary layer 20 is located in the neighborhood of throat height zero position TH0, too. The neighborhood of throat height zero position TH0 means a margin of plus or minus 0.5 $\mu$m.

There may be a slight difference between the position of the air-bearing-surface-side end of the intermediate portion 16B and the position of the auxiliary layer 20. In this case the air-bearing-surface-side end of the intermediate portion 16B may be closer to the air bearing surface or the air-bearing-surface-side end of the auxiliary layer 20 may be closer to the air bearing surface. The difference is preferably 0.5 $\mu$m or below.

Edges of the top pole layer 16 extending in the direction intersecting the air bearing surface include first portions 51 and second portions 52 adjoining the first portions 51. The first portions 51 extend from the air-bearing-surface-side end to the neighborhood of throat height zero position TH0, that is, the first portions 51 are edges of the pole portion 16A. The second portions 52 are edges of a portion of the intermediate portion 16B adjoining the pole portion 16A. The first portions 51 are orthogonal to the air bearing surface. The second portions 52 each form a specific angle with the first portions 51, that is, edges of the pole portion 16A orthogonal to the air bearing surface, and extend outward in the direction of width. The specific angle is preferably within a range between 90 and 120 degrees. The angle is more preferably 90 degrees as shown in FIG. 17. The intermediate portion 16B includes a tapered portion 53 tapered down to the air bearing surface side. It is preferred that an edge of the tapered portion 53 forms an angle of 60 to 80 degrees with a surface parallel to the air bearing surface. The length of the intermediate portion 16B may be 3 to 5 µm.

At least portions of the intermediate portion 16B and the auxiliary layer 20 overlap each other. In the example shown in FIG. 17, in particular, the nearly entire auxiliary layer 20 is overlaid with the portion of the intermediate portion 16B from the air-bearing-surface-side end to a specific position closer to the yoke portion 16C. The auxiliary layer 20 takes a shape approximating to the shape of the portion of the intermediate portion 16B that is placed over the auxiliary layer 20, that is, a shape of trapezoid. The auxiliary layer 20 is greater in width than the portion of the intermediate portion 16B placed over the auxiliary layer 20.

In the embodiment the auxiliary layer 20 increases the thickness of part of the magnetic layer near the portion connecting the pole portion 16A to the yoke portion 16C, that is, near the intermediate portion 16B, compared to the thickness of the other part of the magnetic layer. As a result, according to the embodiment, the volume of the portion of the magnetic layer in the neighborhood of throat height zero position TH0 is greater, compared to a configuration without the auxiliary layer 20. It is therefore possible to prevent magnetic flux saturation in the neighborhood of throat height zero position TH0.

In the embodiment the intermediate portion 16B is provided between the pole portion 16A and the yoke portion 16C whose width is greater than that of the pole portion 16A and smaller than that of the yoke portion 16C. As a result, according to the embodiment, the volume of the portion of the magnetic layer in the neighborhood of throat height zero position TH0 is greater, compared to a configuration without the intermediate portion 16B. It is therefore possible to prevent magnetic flux saturation in the neighborhood of throat height zero position TH0.

According to the embodiment thus described, since the auxiliary layer 20 and the intermediate portion 16B are provided, an optimal overwrite property is obtained even when the pole width is reduced down to the half-micron order or the quarter-micron order. In particular, if at least the pole portion 16A is made of a high saturation flux density material, a magnetic flux effectively reaches the pole portion 16A without saturating before reaching there. An effective recording head is thereby implemented.

In the embodiment the portion of the intermediate portion 16B of the top pole layer 16 that adjoins the pole portion 16A forms a specific angle with an edge of the pole portion 16A orthogonal to the air bearing surface, and extends outward in the direction of width. This configuration allows precise control of the pole portion width even when the pole width is reduced. The reason will be described below.

To fabricate the top pole layer 16, a photoresist is selectively exposed through the use of a mask and patterned in a photolithography process. In this case, rays of light reflected off the apex in slanting and lateral directions cause a problem in the related art. In the embodiment of the invention the top pole layer 16 is formed such that the edges of its portion near throat height zero position TH0 extend outward in the direction of width. Consequently, most of rays of light reflected off the apex in slanting and lateral directions will not reach the region where the pole portion 16A is to be formed from the edges extending outward in the direction of width. The effect of such reflected rays on the region where the pole portion 16A is to be formed is therefore reduced. As a result, it is possible to suppress an increase in the photoresist pattern width in the region. The angle that the portion adjoining the pole portion 16A forms with an edge of the pole portion 16A orthogonal to the air bearing surface is preferably within a range of 90 and 120 degrees. The angle is more preferably 90 degrees as shown in FIG. 17.

According to the embodiment thus described, the pole portion 16A having a specific width is formed even when the pole width is reduced. As a result, the recording track width will not be affected by an amount of lapping of the air bearing surface. The recording track width is therefore precisely controlled. Yields of thin-film magnetic heads are thereby improved as well.

According to the embodiment, the insulating layer 11 defining throat height zero position TH0 is patterned through the use of the auxiliary layer 20. It is therefore possible to align the air-bearing-surface-side ends of the insulating layer 11 and the auxiliary layer 20 with each other in a self-aligned manner. As a result, it is possible to precisely align the air-bearing-surface-side end of the auxiliary layer 20 with throat height zero position TH0. It is thus possible to increase the volume of part of the magnetic layer in the neighborhood of throat height zero position TH0 with reliability.

According to the embodiment, the intermediate portion 16B and the auxiliary layer 20 are formed in different manufacturing steps. In addition, the intermediate portion 16B and the auxiliary layer 20 overlap each other. It is therefore possible to precisely obtain a desired shape of the entire magnetic layer including the top pole layer 16 and the auxiliary layer 20. The reason will now be described. It is easier to precisely fabricate the auxiliary layer 20 compared to the top pole layer 16. Therefore, it is possible to precisely form the shape of the portion of the magnetic layer wherein the intermediate portion 16B and the auxiliary layer 20 overlap through the used of the auxiliary layer 20. Consequently, to fabricate the top pole layer 16, attention is required to be given rather to precisely forming the shape of the pole portion 16A than to the intermediate portion 16B. It is thereby possible to form the shape of the pole portion 16A more precisely. As a result, it is possible to precisely fabricate the magnetic layer that suppresses magnetic flux saturation near throat height zero position TH0 and improves the overwrite property. It is also possible to precisely control the recording track width with excellent repeatability.

Besides the example shown in FIG. 17, there are many other examples of the shapes of the main layer (the top pole layer 16) and the auxiliary layer 20 and their placement in relation to each other. These examples will be described later.

Second Embodiment

Reference is now made to FIG. 9A to FIG. 12A and FIG. 9B to FIG. 12B to describe a second embodiment of the invention. FIG. 9A to FIG. 12A are cross sections each orthogonal to the air bearing surface of a thin-film magnetic head. FIG. 9B to FIG. 12B are cross sections each parallel to the air bearing surface of the pole portion of the magnetic head.

In the manufacturing method of the second embodiment the steps taken until the insulating layer 11 is formed are similar to those of the first embodiment. In the second embodiment, as shown in FIG. 9A and FIG. 9B, auxiliary layers 20 and 21 made of a magnetic material, having a thickness of 1.0 to 2.0 μm, for example, are then selectively formed on the insulating layer 10 by plating, for example, with a photoresist film as a mask. The auxiliary layer 20 defines the position of the air-bearing-surface-side end of the region where thin-film coils are to be formed. The auxiliary layer 21 defines the position of the other end of the region.

Next, as shown in FIG. 10A and FIG. 10B, the insulating layer 11 is etched with the auxiliary layers 20 and 21 as masks so that the insulating layer 11 is formed into a desired shape. Next, a portion of the recording gap layer 10 behind the auxiliary layer 11 (the right side of FIG. 10A) is etched to form a contact hole for making a magnetic path.

Next, in a region extending from the air bearing surface over the auxiliary layer 20, a pole tip 22 made of a magnetic material is formed for the recording head. The thickness of the pole tip 22 is about 1 to 3 μm, for example. At the same time, in a region extending from top of the auxiliary layer 21 to the above-mentioned contact hole, a magnetic layer 23 made of a material the same as that of the pole tip 22 is formed, whose thickness is about 1 to 3 μm, for example, for making the magnetic path. The pole tip 22 makes up part of the top pole layer.

Next, as shown in FIG. 11A and FIG. 11B, the recording gap layer 10 and part of the bottom pole layer 9 are etched by ion milling with the pole tip 22 as a mask. A trim structure is thereby formed. Next, an insulating layer 24 made of alumina, for example, having a thickness of 0.5 to 1.0 μm, for example, is formed in a region between the pole tip 22 and the magnetic layer 23 where the thin-film coils are to be formed. On the insulating layer 24 a thin-film coil 25 of a first layer is formed by plating, for example. Next, an insulating layer 26 made of alumina, for example, having a thickness of about 4 to 6 μm, for example, is formed over the entire surface. The insulating layer 26 is polished to the surfaces of the pole tip 22 and the magnetic layer 23 and flattened. The polishing method may be either mechanical polishing or chemical mechanical polishing (CMP). Through this flattening process the surfaces of the pole tip 22 and the magnetic layer 23 are exposed.

Next, as shown in FIG. 12A and FIG. 12B, a thin-film coil 27 of a second layer is formed by plating, for example, in the region between the pole tip 22 and the magnetic layer 23 where the thin-film coils are to be formed on the insulating layer 26. A photoresist layer 28 is then formed into a specific pattern on the insulating layer 26 and the coil 27. Heat treatment is then performed at a temperature of 200 to 250° C., for example, to flatten the surface of the photoresist layer 28. Next, a top yoke 29 made of a magnetic material and having a thickness of about 2 to 3 μm, for example, is formed in a region extending from top of the portion of the pole tip 22 on the auxiliary layer 20, through top of the photoresist layer 28, to top of the magnetic layer 23. Next, an overcoat layer 30 of alumina, for example, is formed to cover the top yoke 29. Finally, machine processing of the slider is performed to form the air bearing surface of the recording head and the reproducing head. The thin-film magnetic head is thus completed.

In the embodiment the pole tip 22, the magnetic layer 23 and the top yoke 29 make up the main layer of one of the magnetic layers of the invention. The auxiliary layer 20 corresponds to an auxiliary layer of the invention. The auxiliary layer 20, the pole tip 22 and the top yoke 29 are placed to overlap one another.

According to the embodiment, the pole tip 22 is formed on the nearly flat surface without the apex. It is therefore possible to reduce the size of the pole tip 22 down to the half-micron order or the quarter-micron order.

According to the embodiment, the top surface of the pole tip 22 and the top surface of the insulating layer 26 for insulating the thin-film coil 25 of the first layer are flattened and brought to one plane. As a result, the top yoke 29 with less undulation is formed on the pole tip 22. It is therefore possible to reduce the size of the top yoke 29 down to the half-micron order or the quarter-micron order as well.

According to the embodiment, the thick insulating layer 24 is formed between the coil 25 and the bottom pole layer 9, in addition to the thin recording gap layer 10. It is therefore possible to increase the insulation strength between the coil 25 and the bottom pole layer 9 and to reduce flux leakage from the coil 25.

The remainder of configuration, functions and effects of the embodiment are similar to those of the first embodiment.

Third Embodiment

Reference is now made to FIG. 13 to describe a third embodiment of the invention. FIG. 13 is a cross section of a thin-film magnetic head of the embodiment orthogonal to the air bearing surface.

The thin-film magnetic head of the third embodiment is similar to that of the second embodiment except that the auxiliary layer 21 and the insulating layer 11 below the auxiliary layer 21 and the insulating layer 24 are not provided. In addition, the magnetic head of the third embodiment includes a concave portion having a depth of 1 μm, for example, in the region where the thin-film coils are formed in the top surface of the bottom pole layer 9. An insulating layer 31 made of alumina, for example, is formed in the concave portion.

In a method of manufacturing the thin-film magnetic head of the third embodiment, the bottom pole layer 9 is formed and the concave portion is then formed in the top surface of the bottom pole layer 9. The insulating layer 31 is then formed in the concave portion. Alternatively, the insulating layer 31 may be formed over the entire surface of the bottom pole layer 9 and then the top surface may be flattened so that the bottom pole layer 9 is exposed.

According to the embodiment, the thick insulating layers 31 and 11 are placed between the bottom pole layer 9 and the pole tip 22 except the pole portion. Excess flux leakage is thereby prevented between the bottom pole layer 9 and the pole tip 22. The thick insulating layer 31 increases the insulation strength between the coil 25 and the bottom pole layer 9.

The remainder of configuration, functions and effects of the embodiment are similar to those of the second embodiment.

Fourth Embodiment

Figure 14A:
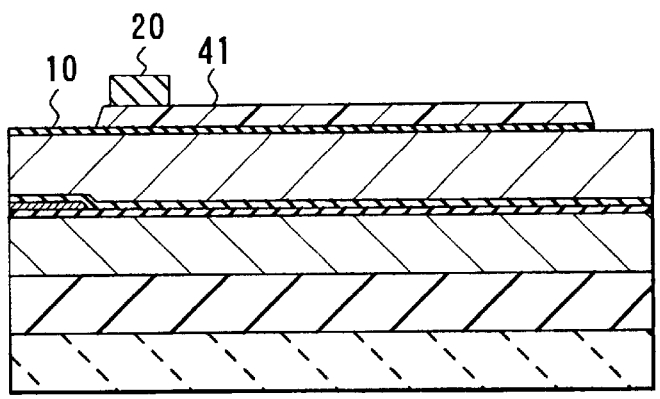
FIG. 14A and FIG. 14B are cross sections of a thin-film magnetic head of a fourth embodiment of the invention.
Figure 14B:
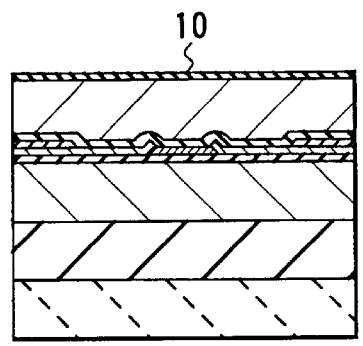

Reference is now made to FIG. 14A to FIG. 16A and FIG. 14B to FIG. 16B to describe a fourth embodiment of the invention. FIG. 14A to FIG. 16A are cross sections each orthogonal to the air bearing surface of a thin-film magnetic head. FIG. 14B to FIG. 16B are cross sections each parallel to the air bearing surface of the pole portion of the magnetic head. 91 In a method of manufacturing a thin-film magnetic head of the fourth embodiment, the steps taken until the recording gap layer 10 is formed are similar to those of the first embodiment. In the fourth embodiment, as shown in FIG. 14A and FIG. 14B, on the recording gap layer 11, a photoresist layer having a thickness of 1.0 to 2.0 µm, for example, is formed into a specific pattern to form an insulating layer 41 that defines the throat height. Next, the auxiliary layer 20 made of a magnetic material, having a thickness of 1.0 to 3.0 µm, for example, is selectively formed through photolithography in the neighborhood of the air-bearing-surface-side end on the insulating layer 41. Next, a portion of the recording gap layer 10 behind the insulating layer 41 (the right side of FIG. 14A) is etched to form a contact hole for making a magnetic path.

Figure 15A:
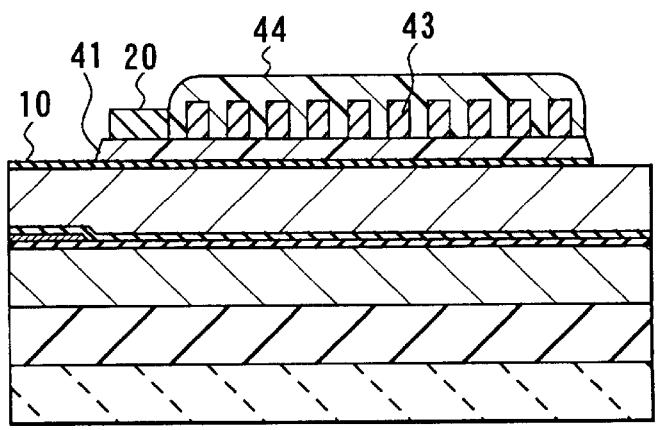
FIG. 15A and FIG. 15B are cross sections for illustrating a step that follows FIG. 14A and FIG. 14B.
Figure 15B:
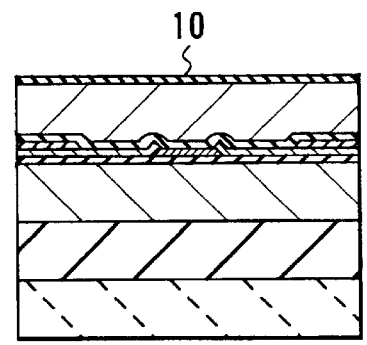

Next, as shown in FIG. 15A and FIG. 15B, a thin-film coil 43 is fabricated on the insulating layer 41. Next, a photoresist layer 44 is formed into a specific pattern on the insulating layer 41 and the coil 43.

Figure 16A:
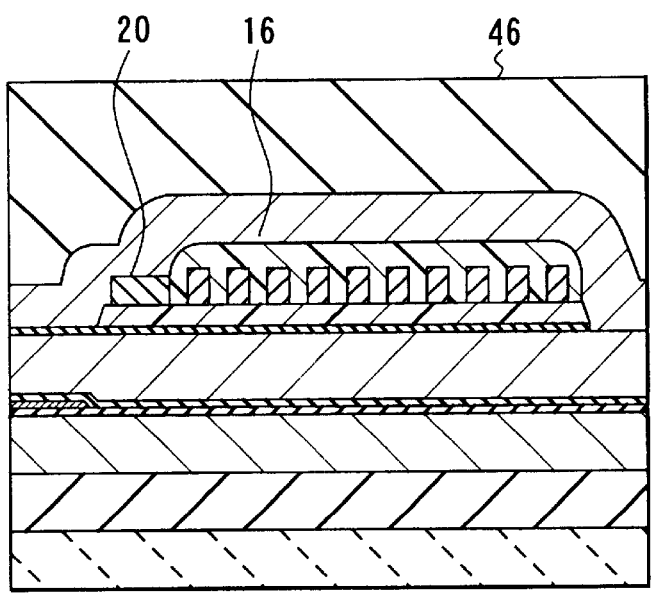
FIG. 16A and FIG. 16B are cross sections for illustrating a step that follows FIG. 15A and FIG. 15B.
Figure 16B:
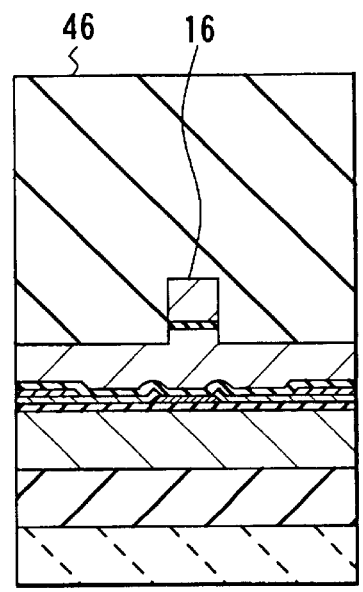

Next, as shown in FIG. 16A and FIG. 16B, the top pole layer 16 made of a magnetic material and having a thickness of about 2 to 3 µm, for example, is formed for the recording head on the recording gap layer 10, the auxiliary layer 20 and the photoresist layer 44. The top pole layer 16 comes to contact with the bottom pole layer 9 and is magnetically coupled to the bottom pole layer 9 in a portion behind the coil 43.

The remainder of configuration, functions and effects of the embodiment are similar to those of the first embodiment.

Shapes of the Main Layer and the Auxiliary Layer and Their Placement in Relation to Each Other in the Embodiments Reference is now made to FIG. 17 to FIG. 30 to describe various examples of shapes of the main layer and the auxiliary layer and their placement in relation to each other in the foregoing embodiments.

FIG. 17 to FIG. 25 show various examples wherein the main layer is made up of a single layer, that is, the top pole layer 16 as in the first or fourth embodiment. The example shown in FIG. 17 is described in the first embodiment.

Figure 18:
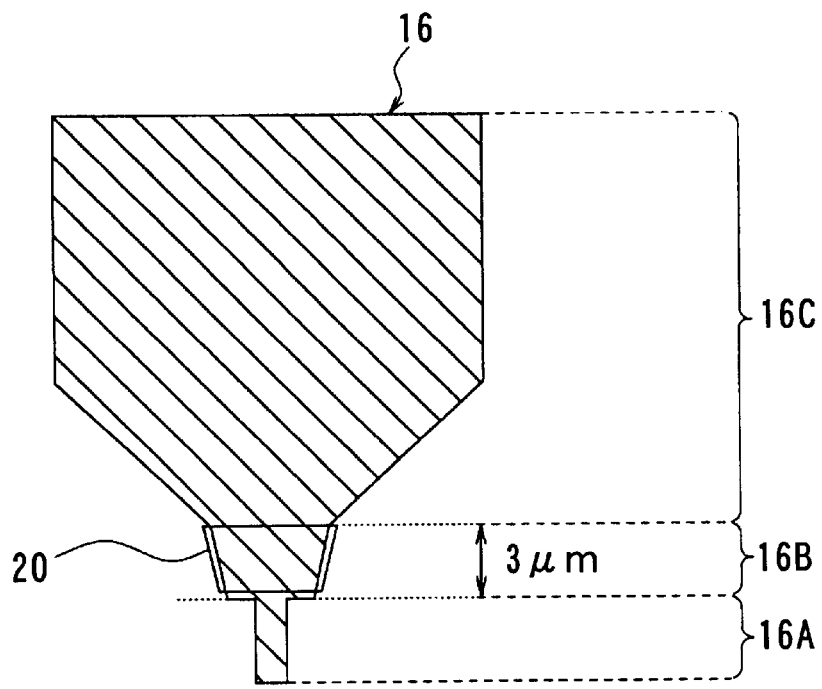
FIG. 18 is a view for illustrating an example of shapes of the main layer and the auxiliary layer and their placement in relation to each other of the invention.

An example shown in FIG. 18 is a special example of the one shown in FIG. 17. That is, in FIG. 18 the intermediate portion 16B of the top pole layer 16 is 3 µm in length. The auxiliary layer 20 is almost entirely overlaid with the intermediate portion 16B. The auxiliary layer 20 takes a shape approximating to the intermediate portion 16B. The other portions of the example shown in FIG. 18 are similar to those of the one shown in FIG. 17.

Figure 19:
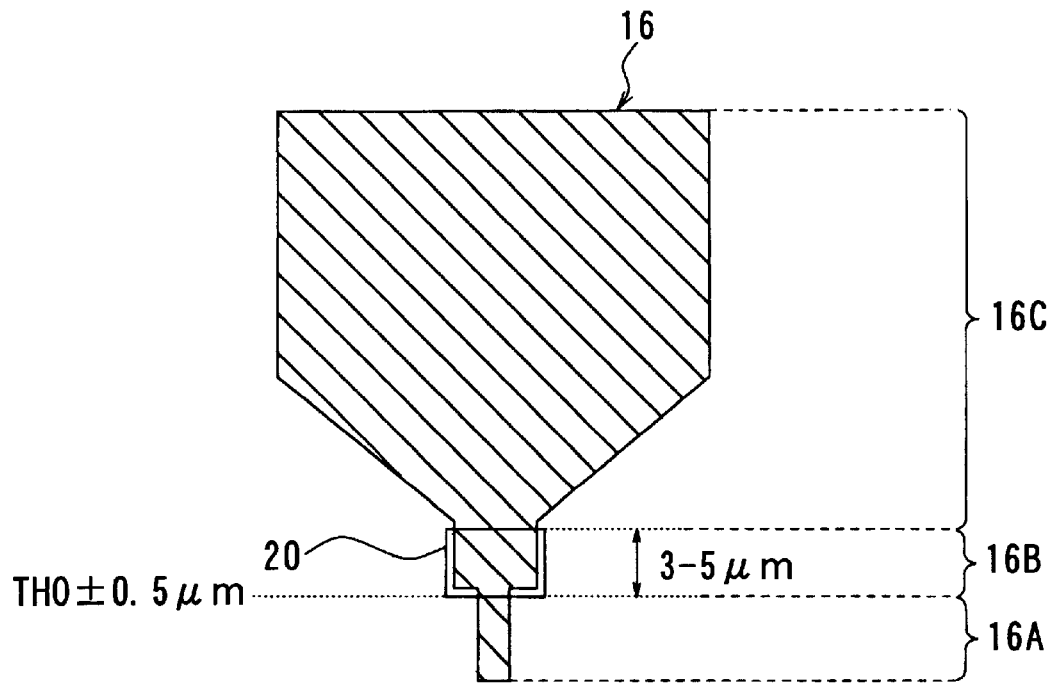
FIG. 19 is a view for illustrating an example of shapes of the main layer and the auxiliary layer and their placement in relation to each other of the invention.

An example shown in FIG. 19 is a modification example of the one shown in FIG. 18. That is, in FIG. 19 the intermediate portion 16B of the top pole layer 16 forms a rectangle. The intermediate portion 16B is 3 to 5 µm in length. The auxiliary layer 20 forms a rectangle approximating to the intermediate portion 16B and is almost entirely overlaid with the intermediate portion 16B. The other portions of the example shown in FIG. 19 are similar to those of the one shown in FIG. 18.

Figure 20:
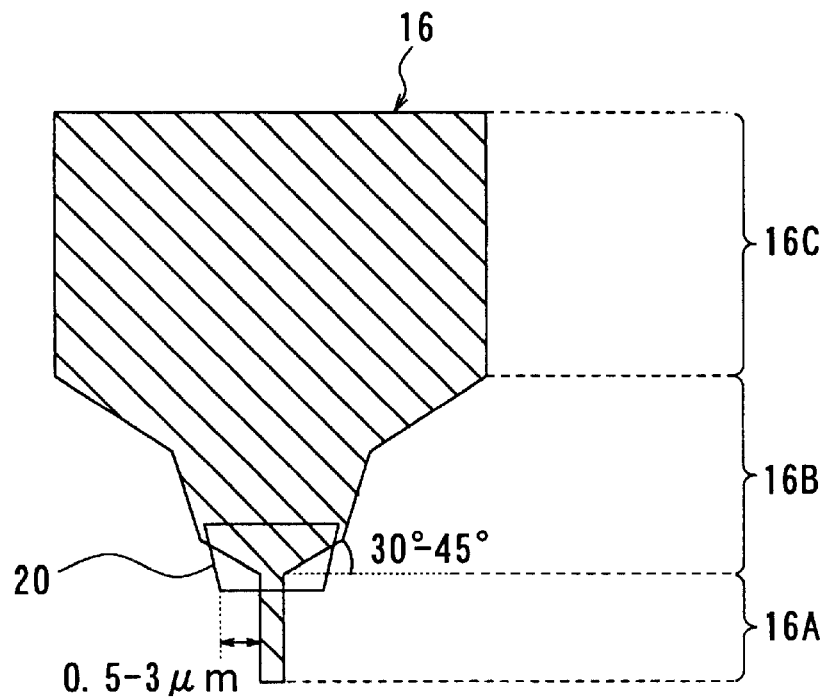
FIG. 20 is a view for illustrating an example of shapes of the main layer and the auxiliary layer and their placement in relation to each other of the invention.

An example shown in FIG. 20 is a modification example of the one shown in FIG. 17. That is, in FIG. 20 the air-bearing-surface-side edges of the intermediate portion 16B are shifted farther from the air bearing surface than the air-bearing-surface-side edge of the auxiliary layer 20. An air-bearing-surface-side edge of the intermediate portion 16B forms an angle of 30 to 45 degrees with a surface parallel to the air bearing surface. The auxiliary layer 20 takes a shape of trapezoid as the example shown in FIG. 17. The distance is 0.5 to 3 µm between the pole portion 16A and one end of the air-bearing-surface-side edge of the auxiliary layer 20. The width of the auxiliary layer 20 is smaller than that of the part of the intermediate portion 16B placed over the auxiliary layer 20. The other portions of the example shown in FIG. 20 are similar to those of the one shown in FIG. 17.

Figure 21:
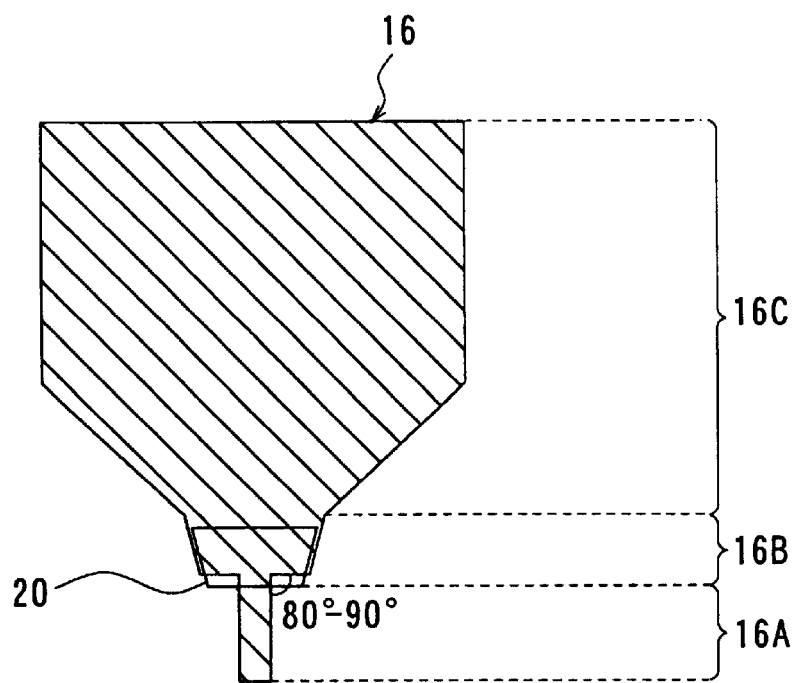
FIG. 21 is a view for illustrating an example of shapes of the main layer and the auxiliary layer and their placement in relation to each other of the invention.

An example shown in FIG. 21 is a modification example of the one shown in FIG. 18. That is, in FIG. 21 the air-bearing-surface-side edge of the intermediate portion 16B is shifted farther from the air bearing surface than the air-bearing-surface-side edge of the auxiliary layer 20. The air-bearing-surface-side edge of the intermediate portion 16B forms an angle of 80 to 90 degrees with an edge of the pole portion 16A orthogonal to the air bearing surface. The width of the auxiliary layer 20 is smaller than that of the part of the intermediate portion 16B placed over the auxiliary layer 20. The other portions of the example shown in FIG. 21 are similar to those of the one shown in FIG. 18.

Figure 22:
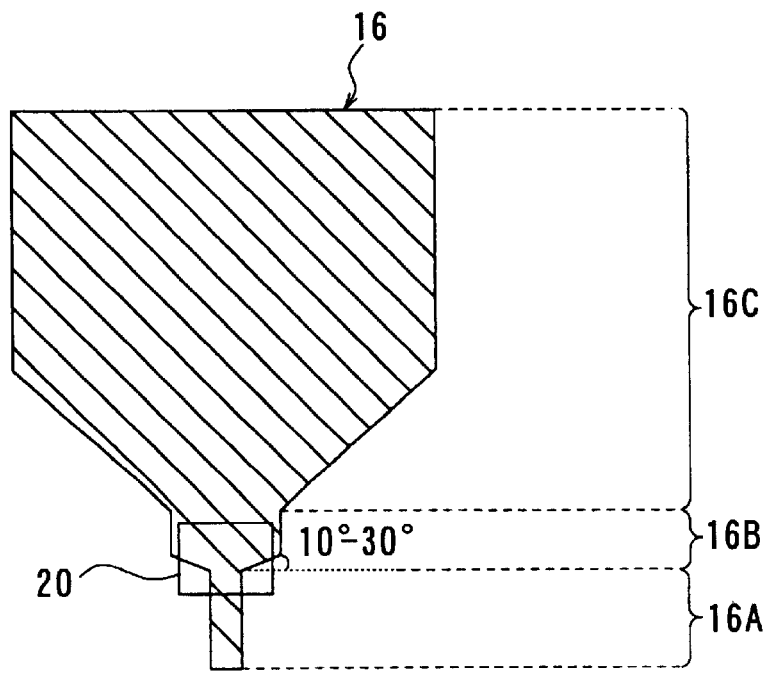
FIG. 22 is a view for illustrating an example of shapes of the main layer and the auxiliary layer and their placement in relation to each other of the invention.

An example shown in FIG. 22 is a modification example of the one shown in FIG. 19. That is, in FIG. 22 the air-bearing-surface-side edge of the intermediate portion 16B is shifted farther from the air bearing surface than the air-bearing-surface-side edge of the auxiliary layer 20. An air-bearing-surface-side edge of the intermediate portion 16B forms an angle of 10 to 30 degrees with a surface parallel to the air bearing surface. The width of the auxiliary layer 20 is smaller than that of the part of the intermediate portion 16B placed over the auxiliary layer 20. The other portions of the example shown in FIG. 22 are similar to those of the one shown in FIG. 19.

Figure 23:
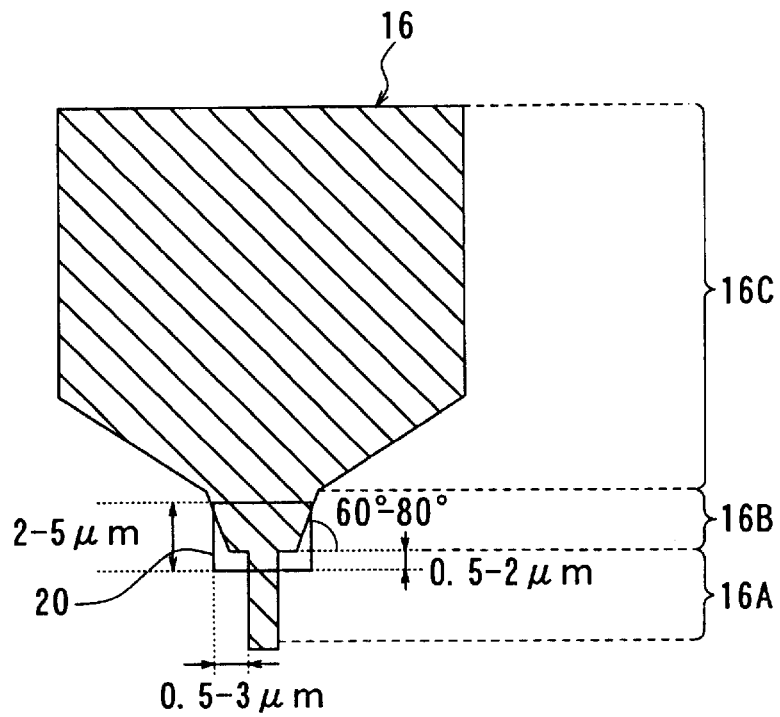
FIG. 23 is a view for illustrating an example of shapes of the main layer and the auxiliary layer and their placement in relation to each other of the invention.

In the example shown in FIG. 23 the top pole layer 16 takes a shape approximating to the one shown in FIG. 18. An edge of the tapered portion of the intermediate portion 16B forms an angle of 60 to 80 degrees with a surface parallel to the air bearing surface. The auxiliary layer 20 forms a rectangle. The length of the auxiliary layer 20 is 2 to 5 µm. The air-bearing-surface-side edge of the intermediate portion 16B is shifted only by 0.5 to 2 µm from the air-bearing-surface-side edge of the auxiliary layer 20 towards the opposite of the air bearing surface. The distance is 0.5 to 3 µm between the pole portion 16A and an end of the auxiliary layer 20 orthogonal to the air bearing surface.

Figure 24:
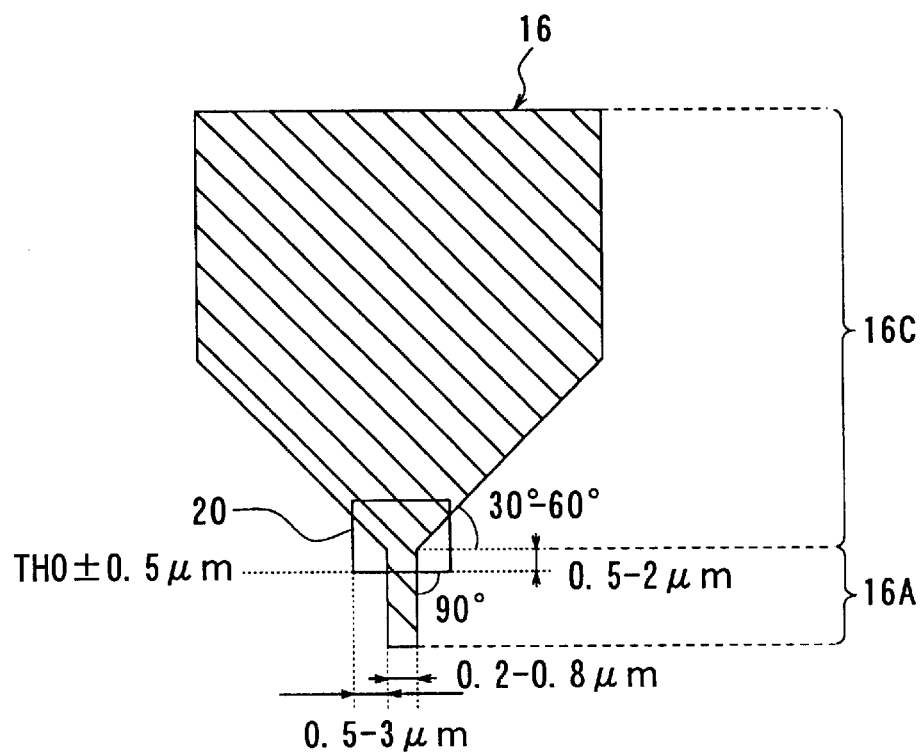
FIG. 24 is a view for illustrating an example of shapes of the main layer and the auxiliary layer and their placement in relation to each other of the invention.

In the example shown in FIG. 24 the top pole layer 16 does not have any intermediate portion but has the pole portion 16A and the yoke portion 16C only. An air-bearing-surface-side edge of the yoke portion 16C forms an angle of 30 to 60 degrees with a surface parallel to the air bearing surface. The width of the pole portion 16A is 0.2 to 0.8 µm. The auxiliary layer 20 forms a rectangle. The air-bearing-surface-side edge of the auxiliary layer 20 forms an angle of 90 degrees with an edge of the pole portion 16A orthogonal to the air bearing surface. The air-bearing-surface-side edge of the auxiliary layer 20 is located in the neighborhood of throat height zero position TH0 (within the range of plus or minus 0.5 µm). The interface between the pole portion 16A and the yoke portion 16C is shifted only by 0.5 to 2 µm from the position in the neighborhood of throat height zero position TH0 towards the opposite of the air bearing surface. The distance is 0.5 to 3 µm between the pole portion 16A and an end of the auxiliary layer 20 orthogonal to the air bearing surface.

Figure 25:
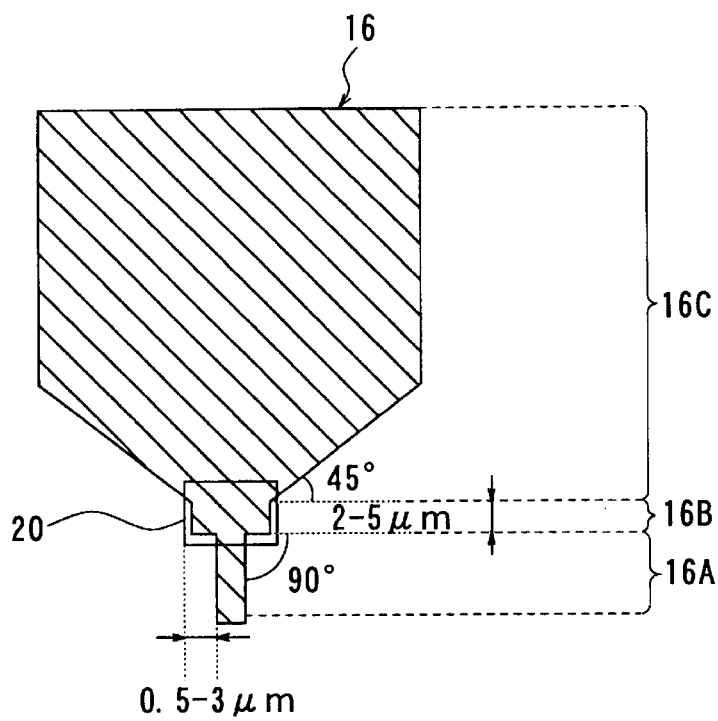
FIG. 25 is a view for illustrating an example of shapes of the main layer and the auxiliary layer and their placement in relation to each other of the invention.

An example shown in FIG. 25 is a modification example of the one shown in FIG. 19. The top pole layer 16 takes a shape approximating to the one shown in FIG. 19. The length of the intermediate portion 16B is 2 to 5 µm. The air-bearing-surface-side edge of the intermediate portion 16B forms an angle of 90 degrees with an edge of the pole portion 16A orthogonal to the air bearing surface. An air-bearing-surface-side edge of the yoke portion 16C forms an angle of 45 degrees with a surface parallel to the air bearing surface. The auxiliary layer 20 forms a rectangle. The auxiliary layer 20 is greater than the intermediate portion 16B and the auxiliary layer 20 is overlaid with the entire intermediate portion 16B. The distance is 0.5 to 3 μm between the pole portion 16A and one end of the air-bearing-surface-side edge of the auxiliary layer 20.

Figure 26:
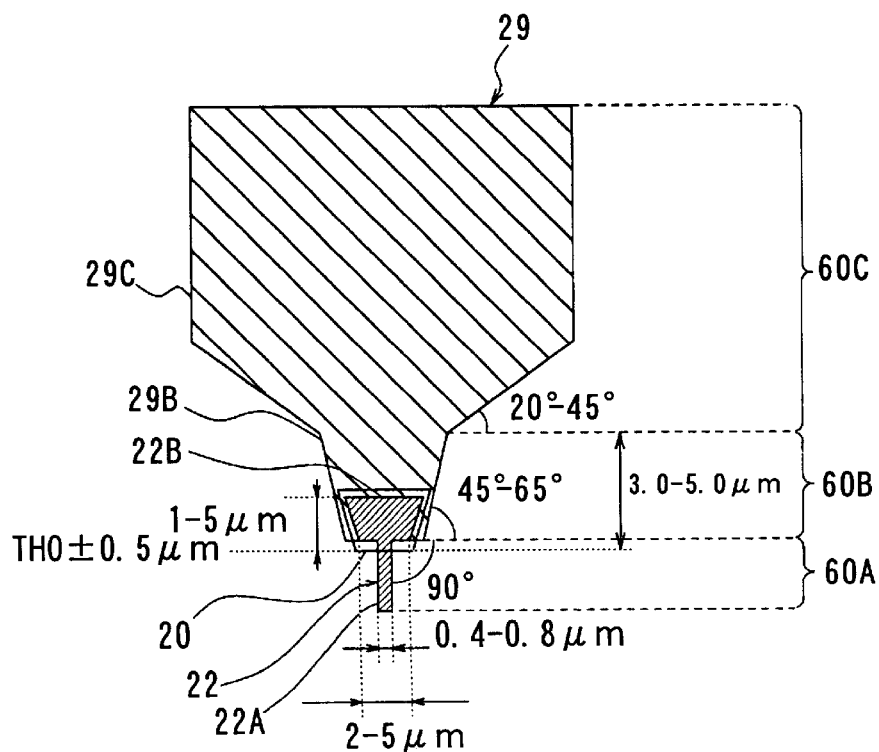
FIG. 26 is a view for illustrating an example of shapes of the main layer and the auxiliary layer and their placement in relation to each other of the invention.
Figure 27:
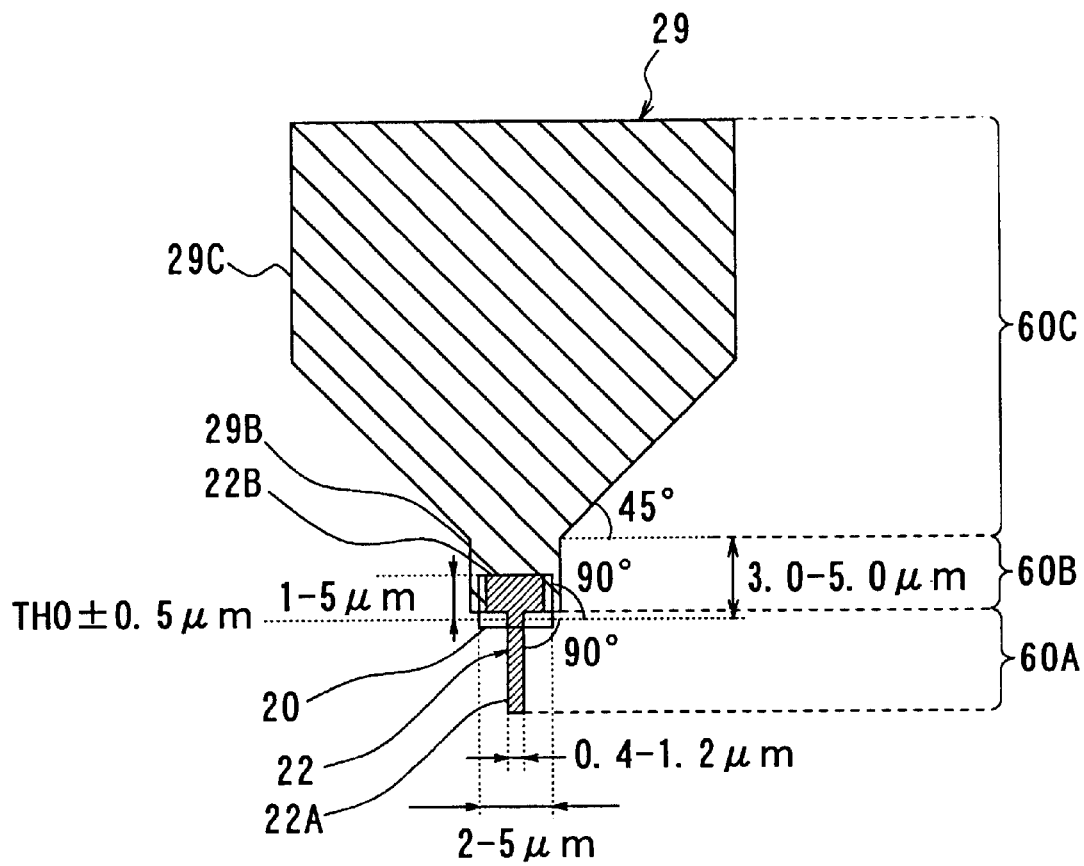
FIG. 27 is a view for illustrating an example of shapes of the main layer and the auxiliary layer and their placement in relation to each other of the invention.

FIG. 26 and FIG. 27 show two examples wherein the main layer is made up of two layers, that is, the pole tip 22 and the top yoke 29 as in the second or third embodiment.

In the example shown in FIG. 26 the main layer made up of the pole tip 22 and the top yoke 29 includes a pole portion 60A, an intermediate portion 60B and a yoke portion 60C. The shape of the entire main layer approximates to the top pole layer 16 shown in FIG. 17. The top yoke 29 includes: an intermediate portion 29B forming the intermediate portion 60B of the entire main layer; and a yoke portion 29C forming the yoke portion 60C of the entire main layer. The pole tip 22 includes: a pole portion 22A forming the pole portion 60A of the entire main layer; and an intermediate portion 22B forming the intermediate portion 60B of the entire main layer. The intermediate portion 22B of the pole tip 22 is smaller than the intermediate portion 29B of the top yoke 29. The entire intermediate portion 22B is overlaid with the intermediate portion 29B.

The pole portion 22A is 0.4 to 0.8 μm in width. The air-bearing-surface-side edge of the intermediate portions 22B and 29B forms an angle of about 90 degrees with an edge of the pole portion 22A orthogonal to the air bearing surface. An edge of the tapered portion of the intermediate portion 29B forms an angle of 45 to 65 degrees with a surface parallel to the air bearing surface. An air-bearing-surface-side edge of the yoke portion 29C forms an angle of 20 to 45 degrees with a surface parallel to the air bearing surface.

The air-bearing-surface-side edge of the auxiliary layer 20 is 2 to 5 μm in width. The air-bearing-surface-side edge of the auxiliary layer 20 is located in the neighborhood of throat height zero position TH0 (within the range of plus or minus 0.5 μm).

The edge of the intermediate portion 22B opposite to the air bearing surface is shifted only by 1 to 5 μm from the position in the neighborhood of throat height zero position TH0 towards the opposite of the air bearing surface. The interface between the intermediate portion 29B and the yoke portion 29C is shifted only by 3 to 5 μm from the position in the neighborhood of throat height zero position TH0 towards the opposite of the air bearing surface. The shape of the auxiliary layer 20 approximates to that of the intermediate portion 22B.

In the example shown in FIG. 27 the main layer made up of the pole tip 22 and the top yoke 29 includes the pole portion 60A, the intermediate portion 60B and the yoke portion 60C. The shape of the entire main layer approximates to the top pole layer 16 shown in FIG. 19. The top yoke 29 includes: the intermediate portion 29B forming the intermediate portion 60B of the entire main layer; and the yoke portion 29C forming the yoke portion 60C of the entire main layer. The pole tip 22 includes: the pole portion 22A forming the pole portion 60A of the entire main layer; and the intermediate portion 22B forming the intermediate portion 60B of the entire main layer. The intermediate portion 22B of the pole tip 22 is smaller than the intermediate portion 29B of the top yoke 29. The entire intermediate portion 22B is overlaid with the intermediate portion 29B.

The pole portion 22A is 0.4 to 1.2 μm in width. The air-bearing-surface-side edge of the intermediate portions 22B and 29B forms an angle of about 90 degrees with an edge of the pole portion 22A orthogonal to the air bearing surface. An edge of the intermediate portion 29B extending in the direction intersecting the air bearing surface forms an angle of about 90 degrees with a surface parallel to the air bearing surface. An air-bearing-surface-side edge of the yoke portion 29C forms an angle of 45 degrees with a surface parallel to the air bearing surface.

The air-bearing-surface-side edge of the auxiliary layer 20 is 2 to 5 μm in width. The air-bearing-surface-side edge of the auxiliary layer 20 is located in the neighborhood of throat height zero position TH0 (within the range of plus or minus 0.5 μm).

The position of the edges of the intermediate portion 22B and the auxiliary layer 20 opposite to the air bearing surface is shifted only by 1 to 5 μm from the position in the neighborhood of throat height zero position TH0 towards the opposite of the air bearing surface. The interface between the intermediate portion 29B and the yoke portion 29C is shifted only by 3 to 5 μm from the position in the neighborhood of throat height zero position TH0 towards the opposite of the air bearing surface. The shape of the auxiliary layer 20 approximates to that of the intermediate portion 22B.

Figure 28:
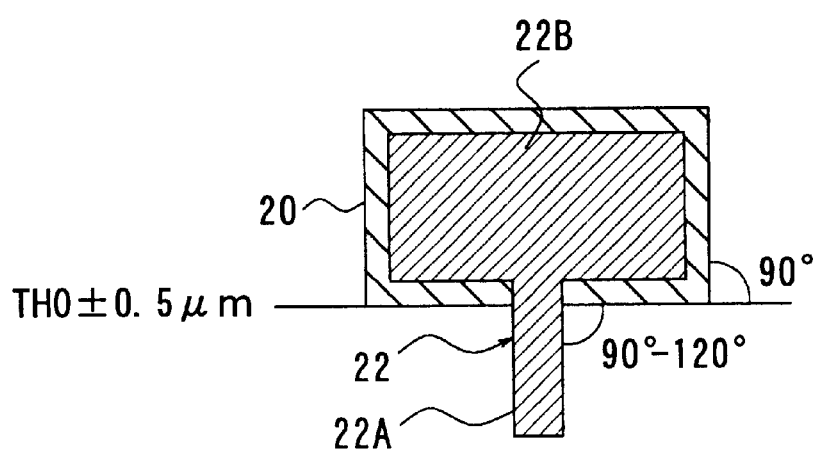
FIG. 28 is a view for illustrating an example of shapes of the main layer and the auxiliary layer and their placement in relation to each other of the invention.
Figure 29:
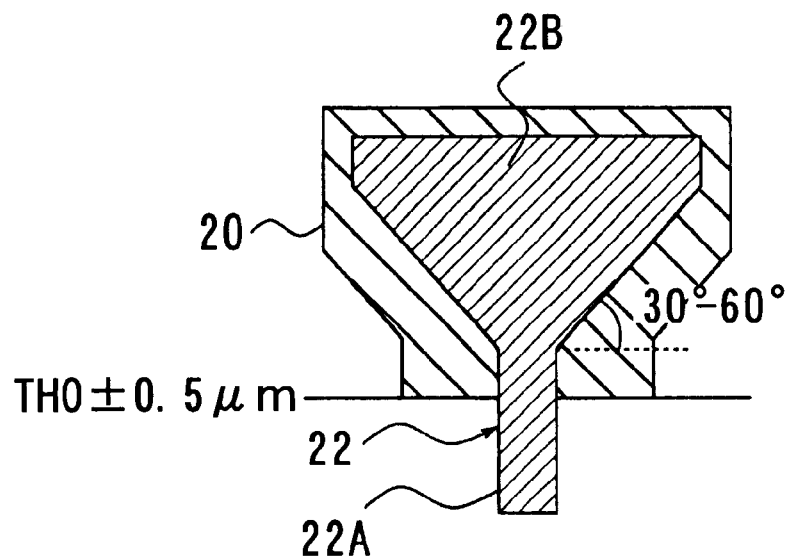
FIG. 29 is a view for illustrating an example of shapes of the main layer and the auxiliary layer and their placement in relation to each other of the invention.
Figure 30:
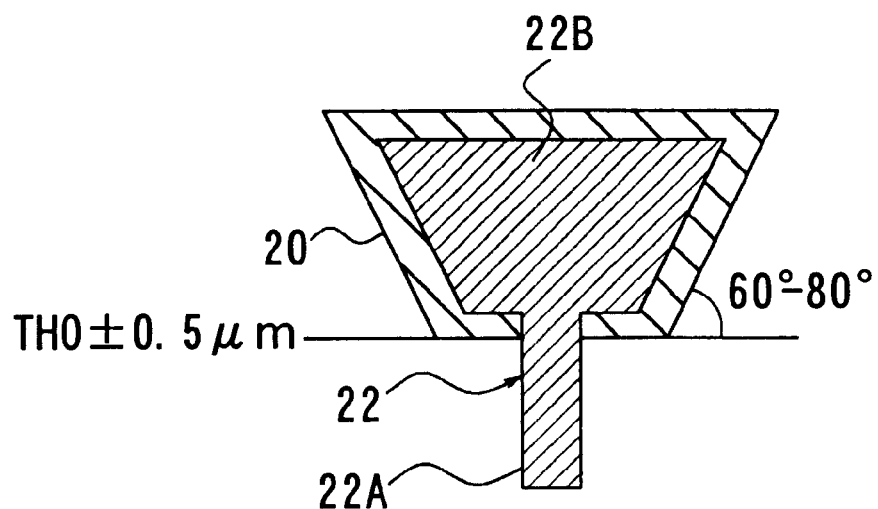
FIG. 30 is a view for illustrating an example of shapes of the main layer and the auxiliary layer and their placement in relation to each other of the invention.
Figure 33A:
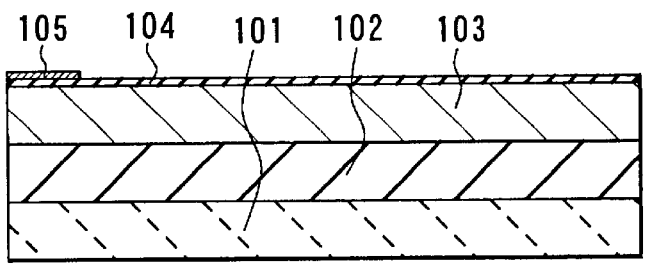
FIG. 33A and FIG. 33B are cross sections for illustrating a step that follows FIG. 32A and FIG. 32B.
Figure 33B:
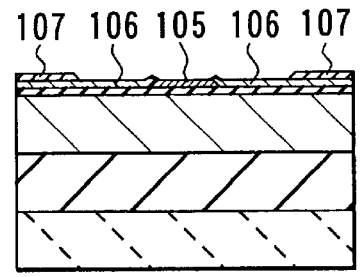
Figure 34A:
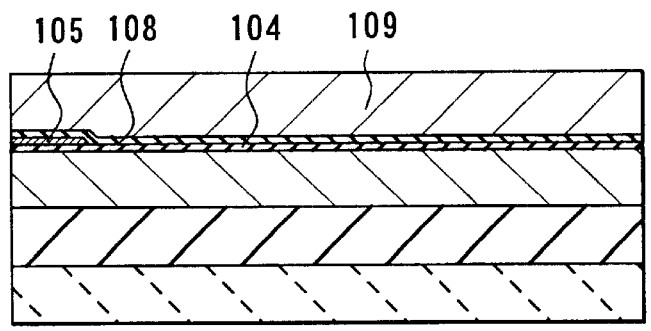
FIG. 34A and FIG. 34B are cross sections for illustrating a step that follows FIG. 33A and FIG. 33B.
Figure 34B:
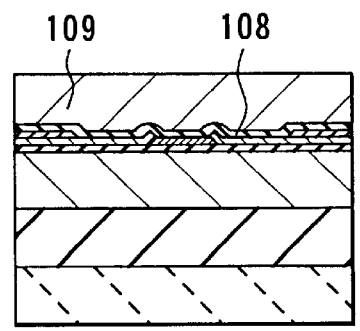
Figure 38:
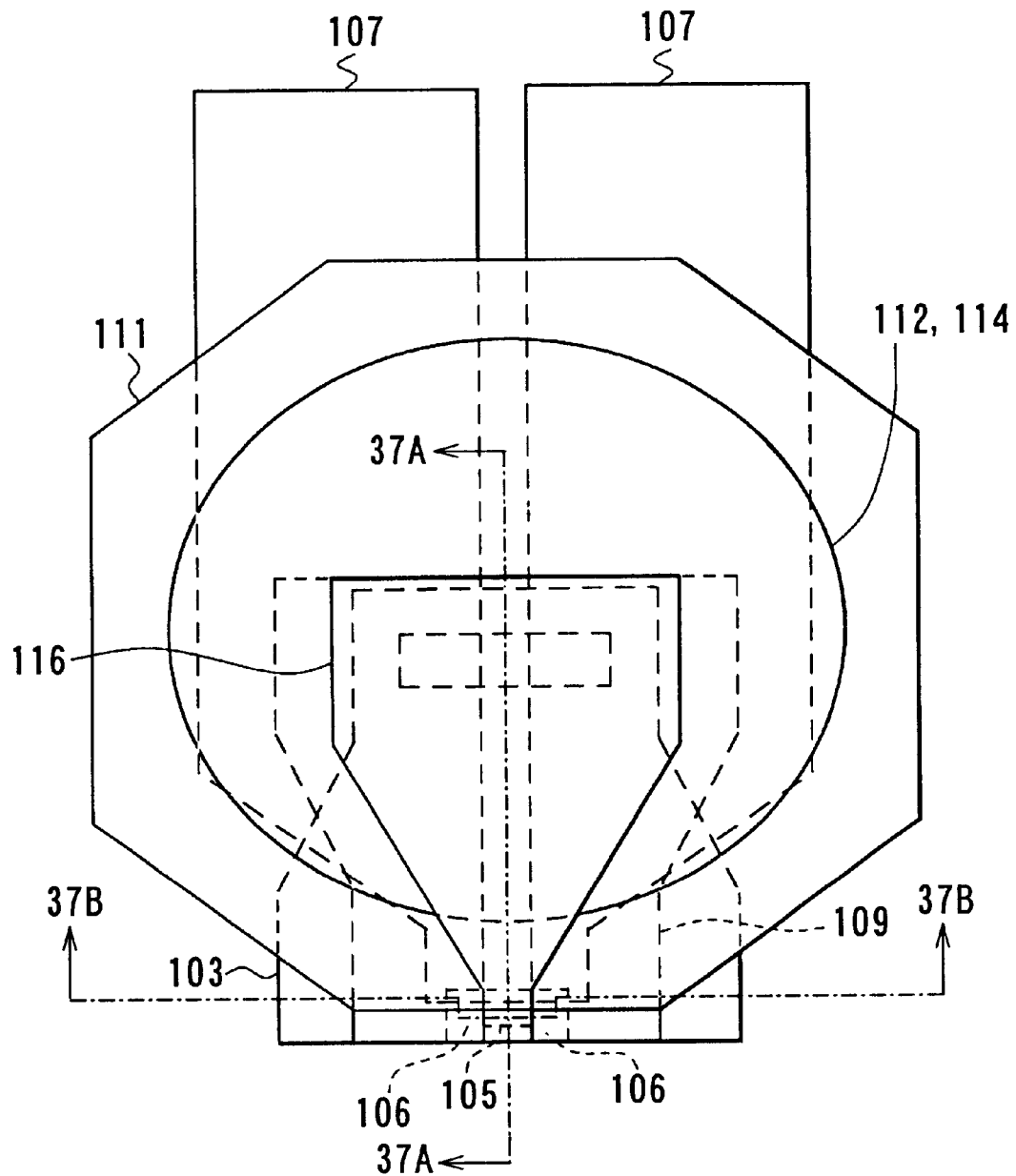
FIG. 38 is a top view of the related-art thin-film magnetic head.
Figure 39:
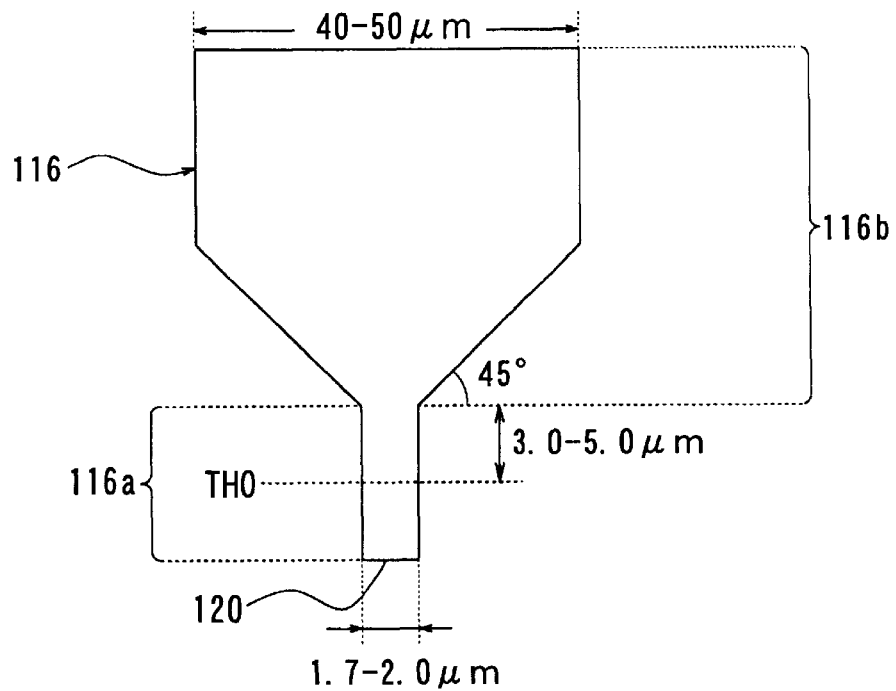
FIG. 39 is a top view of an example of the shape of the top pole layer of the related-art thin-film magnetic head.
Figure 40:
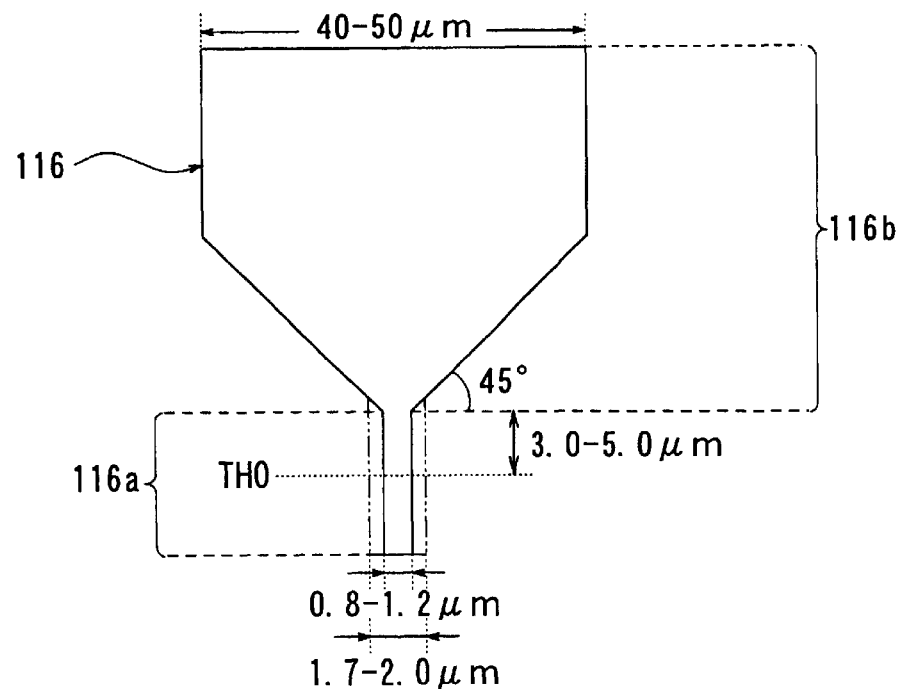
FIG. 40 is a top view of an example of the shape of the top pole layer of the related-art thin-film magnetic head wherein the pole width is reduced.

FIG. 28 to FIG. 30 show three examples of the relation between the pole tip 22 and the auxiliary layer 20 wherein the main layer is made up of two layers, that is, the pole tip 22 and the top yoke 29 as in the second or third embodiment.

In the example shown in FIG. 28 the intermediate portion 22B forms a rectangle. The auxiliary layer 20 takes a shape approximating to that of the intermediate portion 22B and is greater than the intermediate portion 22B. The auxiliary layer 20 is overlaid with the entire intermediate portion 22B. The air-bearing-surface-side edge of the auxiliary layer 20 forms an angle of 90 to 120 degrees with an edge of the pole portion 22A orthogonal to the air bearing surface. An edge of the auxiliary layer 20 extending in the direction intersecting the air bearing surface forms an angle of 90 degrees with a surface parallel to the air bearing surface. The air-bearing-surface-side edge of the auxiliary layer 20 is located in the neighborhood of throat height zero position TH0 (within the range of plus or minus 0.5 μm).

In the example shown in FIG. 29 the intermediate portion 22B has a portion tapered down to the air bearing surface side. An edge of the tapered portion forms an angle of 30 to 60 degrees with a surface parallel to the air bearing surface. The auxiliary layer 20 takes a shape approximating to that of the intermediate portion 22B and is greater than the intermediate portion 22B. The auxiliary layer 20 is overlaid with the entire intermediate portion 22B. The air-bearing-surface-side edge of the auxiliary layer 20 is located in the neighborhood of throat height zero position TH0 (within the range of plus or minus 0.5 μm).

In the example shown in FIG. 30 the intermediate portion 22B has a portion tapered down to the air bearing surface side. The air-bearing-surface-side edge of the intermediate portion 22B forms an angle of about 90 degrees with an edge of the pole portion 22A orthogonal to the air bearing surface. An edge of the tapered portion of the intermediate portion 22B forms an angle of about 60 to 80 degrees with a surface parallel to the air bearing surface. The auxiliary layer 20 takes a shape approximating to that of the intermediate portion 22B and is greater than the intermediate portion 22B. The auxiliary layer 20 is overlaid with the entire intermediate portion 22B. The air-bearing-surface-side edge of the auxiliary layer 20 is located in the neighborhood of throat height zero position TH0 (within the range of plus or minus 0.5 µm).

According to the invention described so far, the main layer and the auxiliary layer magnetically connected to the main layer are provided. The main layer includes the pole portion and the yoke portion. The auxiliary layer is provided for increasing the thickness of part of the magnetic layer in the neighborhood of the portion connecting the pole portion to the yoke portion, compared to the thickness of the other portion of the magnetic layer. As a result, an optimal overwrite property is obtained even when the pole width is reduced.

The edges of the first portion of the main layer extending from the medium-facing-surface-side end to the neighborhood of the medium-facing-surface-side end of the insulating layer may be orthogonal to the medium facing surface. In addition, the edges of the second portion of the main layer adjoining the first portion may extend outward in the direction of width, each forming a specific angle with the first portion. In this case the pole width is precisely controlled even when the pole width is reduced. In particular, if the specific angle falls within a range between 90 and 120 degrees inclusive, the pole width is more precisely controlled.

The overwrite property is further improved if the main layer further includes the intermediate portion that is between the pole portion and the yoke portion in width. The intermediate portion is placed between the pole portion and the yoke portion and magnetically connected to the pole portion and the yoke portion.

In this case, the edges of the pole portion may be orthogonal to the medium facing surface. In addition, the edges of part of the intermediate portion next to the pole portion may extend outward in the direction of width, each forming a specific angle with the first portion. In this case the pole width is precisely controlled even when the pole width is reduced. In particular, if the specific angle falls within a range between 90 and 120 degrees inclusive, the pole width is more precisely controlled.

The present invention is not limited to the foregoing embodiments but may be practiced in still other ways. For example, although the top pole layer or the top pole tip making up the main layer is formed on the auxiliary layer in the foregoing embodiments, the auxiliary layer may be formed on the main layer.

In the foregoing embodiments the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element as well.

A base body having a concave is preferred for the thin-film magnetic head having such a structure. If the coils are formed in the concave of the base body, the thin-film magnetic head is further reduced in size.

Alternatively, the insulating layers formed between the thin-film coils forming the coils of the induction-type magnetic transducer may be all made of inorganic layers.

The invention may be applied to a thin-film magnetic head having only an induction-type magnetic transducer for performing both reading and writing.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces a recording medium;
   a first magnetic layer and a second magnetic layer magnetically coupled to each other and including magnetic pole portions placed in regions of the magnetic layers on a side of the medium facing surface, the pole portions being opposed to each other, the magnetic layers each being made up of at least one layer;
   a gap layer provided between the pole portions of the first and second magnetic layers;
   a thin-film coil at least part of which is placed between the first and second magnetic layers; and
   an insulating layer for insulating the first and second magnetic layers from the thin-film coil, the insulating layer having an end that defines a throat height, wherein one of the magnetic layers includes:
      a main layer including one of the pole portions an end of which is placed in the medium facing surface and a yoke portion magnetically connected directly or indirectly to the other end of the pole portion; and
      an auxiliary layer magnetically connected to the main layer and provided for increasing the thickness of the magnetic layer in the neighborhood of a portion connecting the pole portion to the yoke portion so that the thickness is greater than the thickness of the magnetic layer in the medium facing surface, and
      the end of the insulating layer that defines the throat height is aligned with the position of an end of the auxiliary layer closer to the medium facing surface by etching the insulating layer using the auxiliary layer as a mask.

2. The thin-film magnetic head according to claim 1 wherein the yoke portion is greater than the one of the pole portions in width.

3. The thin-film magnetic head according to claim 1 wherein edges of the main layer extending in the direction intersecting the medium facing surface include: first portions extending from the medium-facing-surface side end of the main layer to the neighborhood of the end of the insulating layer that defines the throat height; and second portions adjoining the first portions;
   the first portions being orthogonal to the medium facing surface, and the second portions extending outward in the direction of width, each forming a specific angle with the first portions.

4. The thin-film magnetic head according to claim 3 wherein the specific angle falls within a range between 90 and 120 degrees inclusive.

5. The thin-film magnetic head according to claim 1 wherein the pole portion and the yoke portion of the main layer are made up of one layer.

6. The thin-film magnetic head according to claim 1 wherein the pole portion and the yoke portion of the main layer are made up of separate layers.

7. The thin-film magnetic head according to claim 6 wherein: the main layer includes a layer including the one of the pole portions and a layer including the yoke portion; and
the layer including the one of the pole portions, the layer including the yoke portion, and the auxiliary layer overlap one another.

8. The thin-film magnetic head according to claim 1, the auxiliary layer being placed between the two magnetic layers.

9. The thin-film magnetic head according to claim 8 the auxiliary layer being placed between the insulating layer and the one of the magnetic layers.

10. The thin-film magnetic head according to claim 1, the main layer further including an intermediate portion placed between the pole portion and the yoke portion and magnetically connected to the pole portion and the yoke portion, the width of the intermediate portion being between that of the pole portion and that of the yoke portion.

11. The thin-film magnetic head according to claim 10 wherein an end of the intermediate portion closer to the medium facing surface is placed in the neighborhood of the end of the insulating layer that defines the throat height.

12. The thin-film magnetic head according to claim 10 wherein: edges of the pole portion extending in the direction intersecting the medium facing surface are orthogonal to the medium facing surface, and
edges of the intermediate portion adjoining the edges of the pole portion extend outward in the direction of width, each forming a specific angle with the edges of the pole portion.

13. The thin-film magnetic head according to claim 12 wherein the specific angle falls within a range between 90 and 120 degrees inclusive.

14. The thin-film magnetic head according to claim 10, the intermediate portion having a part uniform in width.

15. The thin-film magnetic head according to claim 10, the intermediate portion having a part tapered down to the medium-facing-surface-side in width.

16. The thin-film magnetic head according to claim 10 wherein the intermediate portion and the auxiliary layer overlap each other.

17. The thin-film magnetic head according to claim 10 wherein the main layer includes: a first layer including the pole portion and part of the intermediate portion; and a second layer including the yoke portion and the other part of the intermediate portion.

18. The thin-film magnetic head according to claim 17 wherein the first layer, the second layer and the auxiliary layer overlap one another.

19. The thin-film magnetic head according to claim 10 the auxiliary layer having a shape approximating to at least part of the intermediate portion.

20. A method of manufacturing a thin-film magnetic head comprising: a medium facing surface that faces a recording medium; a first magnetic layer and a second magnetic layer magnetically coupled to each other and including magnetic pole portions placed in regions of the magnetic layers on a side of the medium facing surface, the pole portions being opposed to each other, the magnetic layers each being made up of at least one layer; a gap layer provided between the pole portions of the first and second magnetic layers; a thin-film coil at least part of which is placed between the first and second magnetic layers; and an insulating layer for insulating the first and second magnetic layers from the thin-film coil, the insulating layer having an end that defines a throat height, the method including:
the steps of forming the first and second magnetic layers, the gap layer, the thin-film coil, and the insulating layer, respectively, the step of forming one of the magnetic layers including:
the step of forming a main layer including one of the pole portions an end of which is placed in the medium facing surface and a yoke portion magnetically connected directly or indirectly to the other end of the pole portion; and
the step of forming an auxiliary layer on the insulating layer, the auxiliary layer being magnetically connected to the main layer and provided for increasing the thickness of the magnetic layer in the neighborhood of a portion connecting the pole portion to the yoke portion so that the thickness is greater than the thickness of the magnetic layer in the medium facing surface;
the method further including the step of aligning the end of the insulating layer that defines the throat height with the position of an end of the auxiliary layer closer to the medium facing surface by etching the insulating layer using the auxiliary layer as mask.

21. The method according to claim 20 wherein the yoke portion is greater than the one of the pole portions in width.

22. The method according to claim 20 wherein the main layer is formed in the step of forming the main layer in such a manner that edges of the main layer extending in the direction intersecting the medium facing surface include: first portions extending from the medium-facing-surface-side end of the main layer to the neighborhood of the end of the insulating layer that defines the throat height; and second portions adjoining the first portions; the first portions being orthogonal to the medium facing surface, and the second portions extending outward in the direction of width, each forming a specific angle with the first portions.

23. The method according to claim 22 wherein the specific angle falls within a range between 90 and 120 degrees inclusive.

24. The method according to claim 20 wherein the pole portion and the yoke portion of the main layer are made up of one layer.

25. The thin-film magnetic head according to claim 20 wherein the pole portion and the yoke portion of the main layer are made up of separate layers.

26. The method according to claim 25 wherein: the step of forming the main layer includes the step of forming a layer including the one of the pole portions and the step of forming a layer including the yoke portion; and the layer including the one of the pole portions, the layer including the yoke portion, and the auxiliary layer are placed to overlap one another.

27. The method according to claim 20 wherein the auxiliary layer is placed between the two magnetic layers.

28. The method according to claim 27 wherein the auxiliary layer is placed between the insulating layer and the one of the magnetic layers.

29. The method according to claim 20 wherein an intermediate portion is further formed in the step of forming the main layer, the intermediate portion being placed between the pole portion and the yoke portion and magnetically connected to the pole portion and the yoke portion, the width of the intermediate portion being between that of the pole portion and that of the yoke portion.

30. The method according to claim 29 wherein an end of the intermediate portion closer to the medium facing surface is placed in the neighborhood of the end of the insulating layer that defines the throat height.

31. The method according to claim 29 wherein: edges of the pole portion extending in the direction intersecting the medium facing surface are formed to be orthogonal to the medium facing surface, and edges of the intermediate portion adjoining the edges of the pole portion are formed to extend outward in the direction of width, each forming a specific angle with the edges of the pole portion.

32. The method according to claim 31 wherein the specific angle falls within a range between 90 and 120 degrees inclusive.

33. The method according to claim 29 wherein the intermediate portion is formed to have a part uniform in width.

34. The method according to claim 29 wherein the intermediate portion is formed to have a part tapered down to the medium-facing-surface-side in width.

35. The method according to claim 29 wherein the intermediate portion and the auxiliary layer are placed to overlap each other.

36. The method according to claim 29 wherein the step of forming the main layer includes: the step of forming a first layer including the pole portion and part of the intermediate portion; and the step of forming a second layer including the yoke portion and the other part of the intermediate portion.

37. The method according to claim 36 wherein the first layer, the second layer and the auxiliary layer are formed to overlap one another.

38. The method according to claim 29 wherein the auxiliary layer is formed to have a shape approximating to at least part of the intermediate portion.

* * * * *